(12) United States Patent
Shiraishi et al.

(10) Patent No.: US 7,583,265 B2
(45) Date of Patent: Sep. 1, 2009

(54) IMAGE DISPLAY METHOD AND DEVICE, IMAGE DISPLAY SYSTEM, SERVER, PROGRAM, AND RECORDING MEDIUM

(75) Inventors: Atsushi Shiraishi, San Jose, CA (US); Shinji Hattori, Ina (JP); Yosuke Wakamiya, Matsumoto (JP); Shinji Kumakiri, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 245 days.

(21) Appl. No.: 11/460,463

(22) Filed: Jul. 27, 2006

(65) Prior Publication Data
US 2007/0030283 A1   Feb. 8, 2007

(30) Foreign Application Priority Data
Aug. 2, 2005 (JP) ............................. 2005-223935
May 31, 2006 (JP) ............................. 2006-151410

(51) Int. Cl.
    G06T 15/20 (2006.01)
(52) U.S. Cl. ..................................................... 345/427
(58) Field of Classification Search ................ 345/427, 345/653, 672
    See application file for complete search history.

(56) References Cited

U.S. PATENT DOCUMENTS

| | | | | |
|---|---|---|---|---|
| 4,601,003 A | * | 7/1986 | Yoneyama et al. | 715/775 |
| 5,146,557 A | * | 9/1992 | Yamrom et al. | 715/723 |
| 5,275,565 A | * | 1/1994 | Moncrief | 434/29 |
| 5,303,337 A | * | 4/1994 | Ishida | 345/419 |
| 5,303,388 A | * | 4/1994 | Kreitman et al. | 715/836 |
| 5,586,231 A | * | 12/1996 | Florent et al. | 345/472 |
| 5,608,850 A | * | 3/1997 | Robertson | 345/427 |
| 5,611,025 A | * | 3/1997 | Lorensen et al. | 345/419 |
| 5,689,628 A | * | 11/1997 | Robertson | 345/427 |
| 5,781,175 A | * | 7/1998 | Hara | 345/670 |
| 5,838,326 A | * | 11/1998 | Card et al. | 715/775 |
| 5,880,733 A | * | 3/1999 | Horvitz et al. | 715/850 |
| 5,977,978 A | * | 11/1999 | Carey et al. | 345/419 |
| 6,121,966 A | * | 9/2000 | Teodosio et al. | 715/838 |
| 6,160,553 A | * | 12/2000 | Robertson et al. | 715/767 |
| 6,166,738 A | * | 12/2000 | Robertson et al. | 715/839 |
| 6,181,342 B1 | * | 1/2001 | Niblack | 345/635 |

(Continued)

FOREIGN PATENT DOCUMENTS

JP    A-11-175534    7/1999

(Continued)

*Primary Examiner*—Peter-Anthony Pappas
(74) *Attorney, Agent, or Firm*—Oliff & Berridge, PLC

(57) ABSTRACT

An image display method for displaying, after imaging, a plurality of image data each relating to attribute data, includes: disposing a reference image object for indication of each of the plurality of image data at a position based on any one of the corresponding attribute data in a virtual horizontal plane in a virtual three-dimensional (3D) space; selecting one or more of the image data from the plurality of image data; disposing a viewing image object for indication of the selected image data at a position of any of the corresponding reference image objects moved in a direction of a normal or a substantially normal to the virtual horizontal plane; setting a field of view in the virtual 3D space; and imaging the virtual 3D space in the field of view set in the setting the field of view.

13 Claims, 21 Drawing Sheets

U.S. PATENT DOCUMENTS

| | | | |
|---|---|---|---|
| 6,188,405 B1* | 2/2001 | Czerwinski et al. | 715/764 |
| 6,229,542 B1* | 5/2001 | Miller | 715/782 |
| 6,380,933 B1* | 4/2002 | Sharir et al. | 345/419 |
| 6,414,677 B1* | 7/2002 | Robertson et al. | 345/419 |
| 6,498,613 B1* | 12/2002 | Wajima | 715/775 |
| 6,545,687 B2* | 4/2003 | Scott et al. | 345/629 |
| 6,798,412 B2* | 9/2004 | Cowperthwaite | 345/428 |
| 6,948,123 B2* | 9/2005 | Endou et al. | 715/700 |
| 6,967,651 B2* | 11/2005 | Endoh et al. | 345/428 |
| 6,989,832 B2* | 1/2006 | Fukuda | 345/427 |
| 7,042,455 B2* | 5/2006 | Arcas | 345/428 |
| 7,051,291 B2* | 5/2006 | Sciammarella et al. | 715/838 |
| 7,069,506 B2* | 6/2006 | Rosenholtz et al. | 715/273 |
| 7,173,620 B2* | 2/2007 | Endoh et al. | 345/428 |
| 7,249,327 B2* | 7/2007 | Nelson et al. | 715/782 |
| 7,278,115 B1* | 10/2007 | Conway et al. | 715/838 |
| 7,299,101 B2* | 11/2007 | Lukis et al. | 700/98 |
| 7,345,688 B2* | 3/2008 | Baudisch et al. | 345/467 |
| 2002/0021298 A1* | 2/2002 | Fukuda | 345/427 |
| 2003/0095140 A1* | 5/2003 | Keaton et al. | 345/700 |
| 2007/0216681 A1* | 9/2007 | Nishida et al. | 345/427 |

FOREIGN PATENT DOCUMENTS

| | | |
|---|---|---|
| JP | A-2004-164331 | 6/2004 |

\* cited by examiner

IMAGE DISPLAY METHOD AND DEVICE, IMAGE DISPLAY SYSTEM, SERVER, PROGRAM, AND RECORDING MEDIUM

BACKGROUND

1. Technical Field

The present invention relates to an image display method and device, an image display system, a server, a program, and a recording medium, all of which are suited to extract, for viewing, any specific image data from a large amount of image data.

2. Related Art

For display of a large number of images on a display, there is a previous method of displaying size-reduced images, i.e., icon images, in line on a screen of a display. Such display is so-called thumbnail display, and if with a large number of images for thumbnail display, the thumbnail display is not considered effective enough as a display method. This is because simply displaying size-reduced images in line causes a difficulty in correctly grasping the image placement.

Due to such a problem, there is another method for image display, i.e., after extracting a feature level for any specific keyword, disposing an image at a position in a virtual three-dimensional (3D) space on a display corresponding to the feature level. As an example, refer to Patent Document 1 (JP-A-11-1775534) and Patent Document 2 (JP-A-2004-164331). This method enables effective display of a large number of images by image grouping. That is, images defined to have about the same feature level are put in the same group, and images are collectively disposed on the virtual 3D space on a group basis.

The issue with such methods as above for image display is that, if detail viewing is desired for the images, there needs to enlarge the images piece by piece for viewing, i.e., viewing display. That is, the thumbnail display made on the virtual 3D space functionally serves merely as a tool to select any desired image for viewing, and viewing display for any one image data is completely independent from viewing display for the remaining image data. In other words, by a viewer remembering the positional relationship, i.e., grouping relationship, between viewing display and thumbnail display, the relationship among viewing displays is merely grasped. In this sense, the above-described methods are not suitable enough for image viewing by selecting some image data out of many others.

SUMMARY

An advantage of some aspects of the invention to provide an image display method and device, an image display system, a server, a program, and a recording medium storing thereon the program, all of which are suited to view the contents of any specific image data selected from a large amount of image data.

A first aspect of the invention is directed to an image display method for displaying, after imaging, a plurality of image data each relating to attribute data. The image display method includes: disposing a reference image object for indication of each of the plurality of image data at a position based on any one of the corresponding attribute data in a virtual horizontal plane in a virtual three-dimensional (3D) space; selecting one or more of the image data from the plurality of image data; disposing a viewing image object for indication of the selected image data at a position of any of the corresponding reference image objects moved in a direction of a normal or a substantially normal to the virtual horizontal plane; setting a field of view in the virtual 3D space; and imaging the virtual 3D space in the field of view set in the setting the field of view.

With the image display method of the first aspect, any one corresponding attribute data is used as a basis to define the positions at which a reference image object and a viewing image object are disposed in a virtual 3D space. Accordingly, for viewing any specific viewing image object, the positional relationship with the reference image object or any other viewing image objects helps recognition of the relative relationship with the attribute data. Moreover, because the viewing image object is disposed with a distance from the virtual horizontal plane, various many reference image objects never annoy a viewer when he or she views the viewing image object in any appropriate field of view.

Preferably, with the image display method of the first aspect, the viewing image object is disposed to derive orthogonality or substantial orthogonality between a display plane and the virtual horizontal plane.

With such an image display method, substantial orthogonality is derived between the display plane of the viewing image object and the virtual horizontal plane. This accordingly allows the viewer to view the viewing image object in a different dimension from the reference image object.

Still preferably, with the image display method of the first aspect, the viewing image object is disposed after being enlarged compared with the reference image object.

With such an image display method, the enlarged viewing image object allows the viewer to view in detail the contents of the selected image data.

Still preferably, with the image display method of the first aspect, an enlargement ratio of the viewing image object is determined based on the other of the corresponding attribute data.

Still preferably, the other attribute data is about a significance level of the image data.

With such an image display method, the enlargement ratio of the viewing image object is determined based on any other corresponding attribute data so that the size of the viewing image object can serve well for recognition of the other attribute data.

Still preferably, with the image display method of the first aspect, a distance of the viewing image object from the virtual horizontal plane is determined based on the other of the corresponding attribute data.

With such an image display method, a distance of the viewing image object from the virtual horizontal plane is determined based on the other corresponding attribute data so that the viewer's space perception between the viewing image object and the virtual horizontal plane can serve well for recognition of the other data.

Still preferably, in the image display method of the first aspect, at least the disposing the viewing image object and the imaging are performed at predetermined time intervals, and the method includes calculating a path along which the viewing image object is disposed at the respective time intervals, and which swings around the position of any of the corresponding reference image objects moved in the direction of the normal or the substantially normal to the virtual horizontal plane.

With such an image display method, the viewing image object is displayed as a moving image as if being in a swing motion so that any overlap between the viewing image objects can be controlled by changing the time interval. This ideally helps the viewer to view, without changing his or her point of sight, any viewing image objects overlapping each other in the depth direction of the field of view.

Still preferably, with the image display method of the first aspect including the calculating the object path, the swing width or the swing cycle of the path is determined based on the other corresponding attribute data.

With such an image display method, the swing width or the swing cycle of the viewing image object when being in a swing motion is determined based on the other of the corresponding attribute data so that the viewer's perception how the viewing image object is being in a swing motion can serve well for recognition of the other corresponding attribute data.

Still preferably, the image display method of the first aspect includes disposing a text object for display of the attribute data over or in the vicinity of any of the corresponding reference image objects or the viewing image object.

With such an image display method, a text object disposed in the vicinity of the reference image object or the viewing image object can help the viewer directly perceive the corresponding attribute data.

Still preferably, the image display method of the first aspect includes projecting a projection object for indication of the projection position of the viewing image object on the virtual horizontal plane.

With such an image display method, a projection object eases to perceive the positional relationship relative to a reference image object disposed in the virtual horizontal plane.

More preferably, the image display method of the first aspect includes: acquiring input information about the attribute data; and performing a search of the image data relating to the input information. In the selecting the data, the image data found in the performing the search is selected.

With such an image display method, input information relating to any specific attribute, e.g., any specific keyword, is used to make a search of image data relating thereto, and thus found image data is displayed as a viewing image object. This accordingly achieves effective image viewing of any needed image data.

Still preferably, with the image display method of the first aspect, the setting the field of view and the selecting the data are performed based on setting conditions in storage.

With such an image display method, based on the conditions set for selection of the field of view and the image data, images are reproduced as they are originally stored. This favorably makes the images available for presentation use.

Still preferably, in the image display method of the first aspect, at least the setting the field of view and the imaging are performed at predetermined time intervals, and the method includes calculating a path along which a point of sight moves at each of the time intervals in the field of view, and which goes around the virtual 3D space.

With such an image display method, images are displayed as moving images to allow the point of sight goes around in the virtual 3D space so that the viewer can easily get the overall perspective for the reference image object and the viewing image object.

Still preferably, with the image display method of the first aspect, when first and second of the plurality of image data are selected in the selecting the data, at least the setting the field of view and the imaging are performed at the predetermined time intervals. The image display method includes calculating a path along which a point of sight moves at each of the time intervals in the field of view, and which extends from a first point facing a viewing image object corresponding to the first image data to a second point facing a viewing image object corresponding to the second image data.

With such an image display method, the reference image object is available for viewing at a point of sight associated with the first point suitable for viewing of an image display object corresponding to the first image data, and at a point of sight associated with the second point suitable for viewing of an image display object corresponding to the second image data. What is more, because the course from the first point to the second point is displayed as a moving image as the point of sight moves, the viewer can understand the relative relationship with the attribute data between the first and second image data by looking at the reference image object in the course.

A second aspect of the invention is directed to an image display device for displaying, after imaging, a plurality of image data each relating to attribute data. The image display device includes: a reference image disposition section that disposes a reference image object for indication of each of the plurality of image data at a position based on any one of the corresponding attribute data in a virtual horizontal plane in a virtual three-dimensional (3D) space; a data selection section that selects one or more of the image data from the plurality of image data; a viewing image disposition section that disposes a viewing image object for indication of the selected image data at a position of any of the corresponding reference image objects moved in a direction of a normal or a substantially normal to the virtual horizontal plane; a field of view setting section that sets a field of view in the virtual 3D space; and an imaging section that images the virtual 3D space in the field of view set in the field of view setting section.

With the image display device of the second aspect, any one corresponding attribute data is used as a basis to define the positions at which the reference image object and the viewing image object are disposed in the virtual 3D space. Accordingly, for viewing any specific viewing image object, the positional relationship with the reference image object or any other viewing image objects helps a viewer recognize the relative relationship with the attribute data. Moreover, because the viewing image object is disposed with a distance from the virtual horizontal plane, various many reference image objects never annoy the viewer when he or she views the viewing image object in any appropriate field of view.

A third aspect of the invention is directed to an image display system that includes: an electronic device equipped with the above-described image display device; and an electro-optical device that displays thereon, as a video, information through with an imaging process in the image display device.

A fourth aspect of the invention is directed to an image display system for displaying over a network, after imaging, a plurality of image data each relating to attribute data. The image display system includes: a memory region that generates a virtual three-dimensional (3D) space; a reference image disposition section that disposes a reference image object for indication of each of the plurality of image data at a position based on any one of the corresponding attribute data in a virtual horizontal plane in the virtual 3D space; a data selection section that selects one or more of the image data from the plurality of image data; a viewing image disposition section that disposes a viewing image object for indication of the selected image data at a position of any of the corresponding reference image objects moved in a direction of a normal or a substantially normal to the virtual horizontal plane; a field of view setting section that sets a field of view in the virtual 3D space; and an imaging section that images the virtual 3D space in the field of view set in the field of view setting section.

A fifth aspect of the invention is directed to a server in an image display system for displaying over a network, after imaging, a plurality of image data each relating to attribute data. The server includes: a memory region that generates a virtual three-dimensional (3D) space; a reference image disposition section that disposes a reference image object for indication of each of the plurality of image data at a position based on any one of the corresponding attribute data in a virtual horizontal plane in the virtual 3D space; a viewing image disposition section that disposes a viewing image object for indication of the selected image data at a position of any of the corresponding reference image objects moved in a direction of a normal or a substantially normal to the virtual horizontal plane; and an imaging section that images the virtual 3D space in the field of view set in the field of view setting section.

A sixth aspect of the invention is directed to a program for use with a computer to execute an operation for displaying, after imaging, a plurality of image data each relating to attribute data. The program includes: disposing a reference image object for indication of each of the plurality of image data at a position based on any one of the corresponding attribute data in a virtual horizontal plane in a virtual three-dimensional (3D) space; selecting one or more of the image data from the plurality of image data; disposing a viewing image object for indication of the selected image data at a position of any of the corresponding reference image objects moved in a direction of a normal or a substantially normal to the virtual horizontal plane; setting a field of view in the virtual 3D space; and imaging the virtual 3D space in the field of view set in the setting the field of view.

A seventh aspect of the invention is directed to a recording medium that stores therein the above-described program.

BRIEF DESCRIPTION OF THE DRAWINGS

The invention will be described with reference to the accompanying drawings, wherein like numbers reference like elements.

DESCRIPTION OF EXEMPLARY EMBODIMENTS

In the below, embodiments of the invention are described in detail by referring to the accompanying drawings.

While the embodiments are described below specifically as preferable examples of the invention with various restrictive expressions as technically preferable, the following description is in all aspects illustrative and not restrictive. It is understood that numerous other modifications and variations can be devised unless otherwise specified.

First Embodiment

Figure 1:
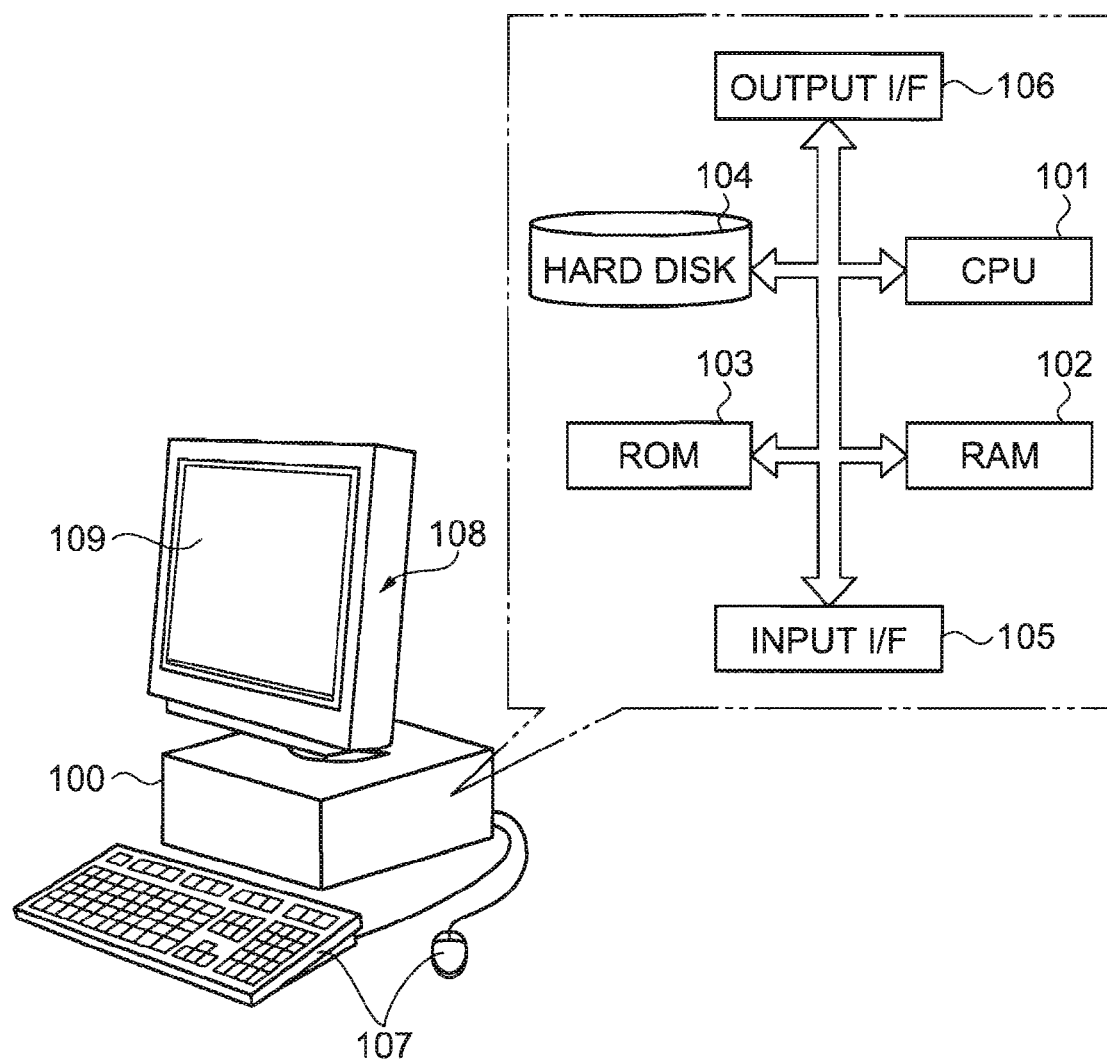
FIG. 1 is a diagram showing an exemplary hardware configuration that implements an image display method of the invention.
Figure 2:
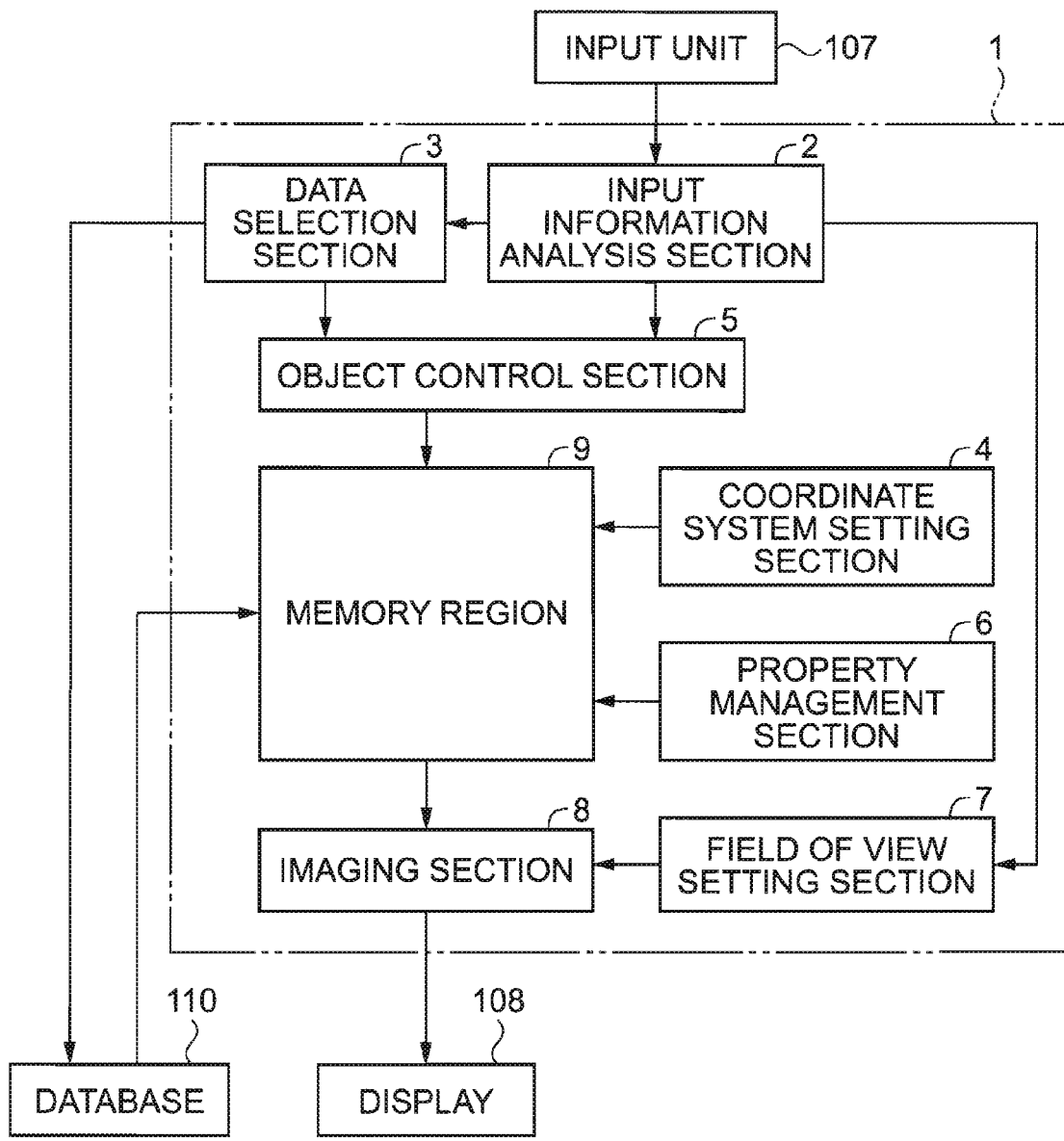
FIG. 2 is a function block diagram of an image display device.
Figure 3:
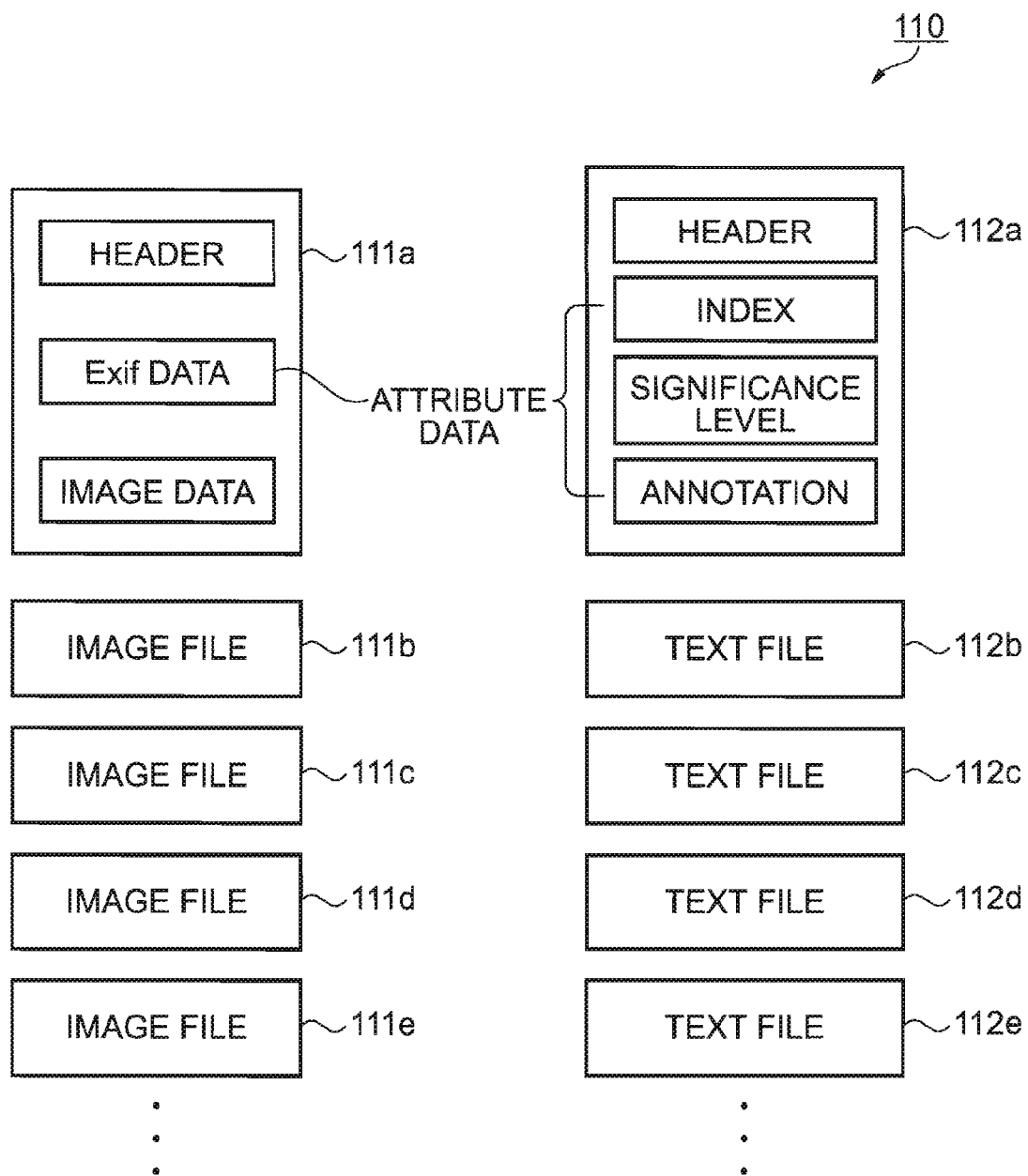
FIG. 3 is a diagram showing the configuration of a database.

By referring to FIGS. 1 to 3, described first are the configurations of an image display device and a database of the invention.

FIG. 1 is a diagram showing an exemplary hardware configuration that implements an image display method of the invention. FIG. 2 is a function block diagram of an image display device. FIG. 3 is a diagram showing the configuration of a database.

The image display device of the first embodiment is configured by using a general-purpose computer 100 of FIG. 1. The computer 100 includes a CPU (Central Processing Unit) 101, a RAM (Random Access Memory) 102, a ROM (Read Only Memory) 103, a hard disk 104, an input interface (I/F) 105, and an output interface (I/F) 106, all of which are connected together via an internal bus. The computer 100 is capable of acquiring input information from an input unit 107, e.g., a mouse, or a keyboard, connected to the input I/F 105. The computer 100 is also capable of displaying images on a display screen 109 via a display 108, which is connected to the output I/F 106.

The CPU 101 reads out a predetermined application program stored in the hard disk 104, and executes the application program while using the RAM 102 and/or the hard disk 104 as a working memory. Through such program execution, the computer 100 serves as an image display device 1 of FIG. 2.

Alternatively, the predetermined application program may be supplied from the outside by a recording medium exemplified by a CD-ROM (Compact Disc Read Only Memory), a DVD (Digital Versatile Disk), and a magneto-optic disk, and stored into the hard disk 104 via a recording medium reading device that is not shown. Still alternatively, the predetermined application program may be downloaded over a network unit such as the Internet for storage into the hard disk 104.

In FIG. 2, the image display device 1 includes function blocks serving as an input information analysis section 2, a data selection section 3, a coordinate system setting section 4, an object control section 5, a property management section 6, a field of view setting section 7, an imaging section 8, and a memory region 9. The image display device 1 is so configured as to be accessible to an external database 110.

As exemplary shown in FIG. 3, the database 110 is configured as a cluster of image files 111a, 111b, and others, and a cluster of text files 112a, 112b, and others. These image files and text files are those stored in the hard disk 104 (refer to FIG. 1), for example. For link management, a link is established between the image file 111a and the text file 112a, between the image file 111b and the text file 112b, and between others, using header information, e.g., file name, so that files are handled as if being a single file.

The image files 111a, 111b, and others are JPEG files, for example, and include Exif data and image data. Here, the Exif data is the one recorded with image capture information derived by a digital camera, and the image data is compressed bitmap data. The text files 112a, 112b, and others each include text data indicating the attribute of the corresponding image data, e.g., index, significance level, and annotation. The text data is referred to as attribute data together with the Exif data, and is handled as data related to the respective image data.

In this embodiment, the text data is input by the respective users, but alternatively, may be automatically generated based on the contents of the image data and/or the Exif data by the application program or others. The "significance level" of the text data is an index to indicate how much the corresponding image data is attracting the users' interest, and may be automatically updated based on the number of accesses made to the image data, i.e., image file.

The database 110 is not necessarily configured as above, and may be variously configured in terms of the file format and the data format. For example, the image data and the attribute data may be put in the same file. The image data includes intermediate data, document data, and others, whatever data in the format with which data imaging is indirectly possible. Here, the intermediate data and the document data are for display of computer graphics. Other than that, the attribute data may include diary data, Electronic-mail (E-mail) data, and others, whatever relating to the user-input image data.

Referring back to FIG. 2, the input information analysis section 2 takes charge of analyzing the input information coming from the input unit 107. The data selection section 3 takes charge of, by referring to the database 110, selecting any specific image data out of many others. The coordinate system setting section 4 takes charge of setting a coordinate system in the memory region 9 for the virtual 3D space. The object control section 5 serves as a reference image disposition section and a viewing image disposition section, and takes charge of exercising control over various objects to be generated (disposed) on the virtual 3D space in the memory region 9. The property management section 6 manages static attributes of the objects, e.g., information about the object shape. The field of view setting section 7 takes charge of exercising control over the field of view (point of sight and line of sight) for imaging of the virtual 3D space in the memory region 9. The imaging section 8 takes charge of imaging of the virtual 3D space in the memory region 9 by computer graphics for display on the display 108.

By referring to FIGS. 2, 4, 5, and 6, described next is initial display of the image display device.

Figure 4:
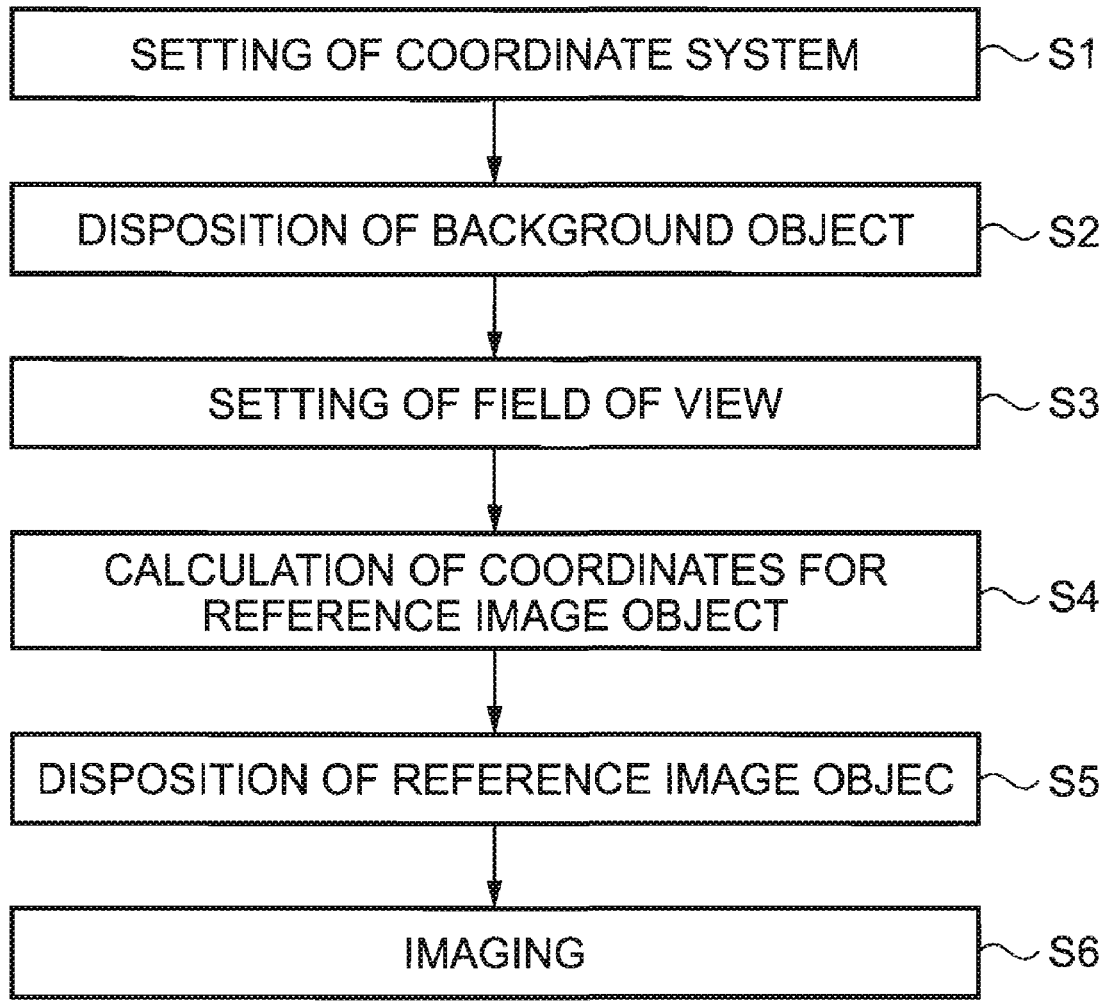
FIG. 4 is a flowchart showing a process flow of initial display.
Figure 5:
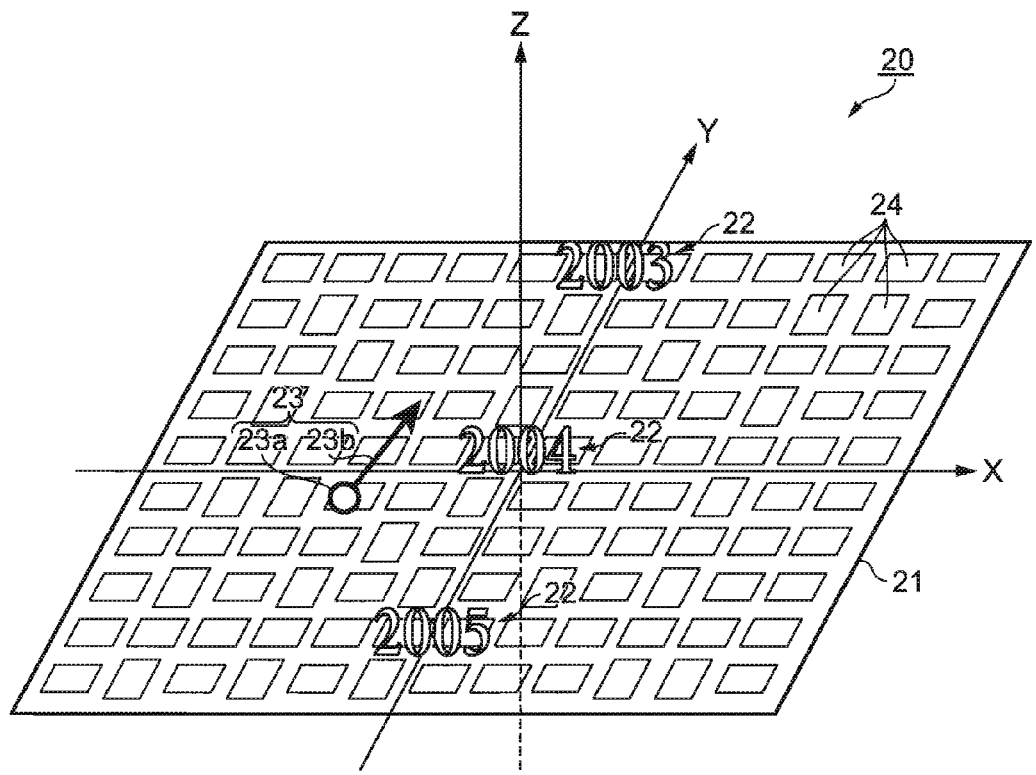
FIG. 5 is a diagram showing a virtual three-dimensional (3D) space.
Figure 6:
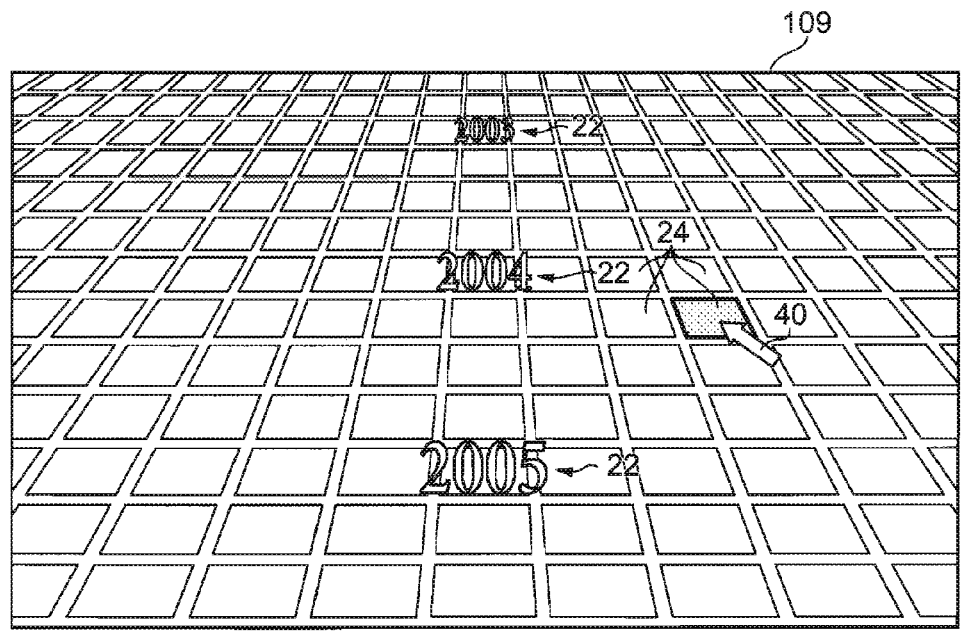
FIG. 6 is a diagram showing a display image displayed on a display screen.

FIG. 4 is a flowchart showing a process flow of initial display. FIG. 5 is a diagram showing a virtual 3D space. FIG. 6 is a diagram showing a display image displayed on a display screen.

With initial display, the image display device 1 generates a virtual three-dimensional (3D) space 20 in the memory region 9. The virtual 3D space 20 carries therein a plurality of reference image objects 24 as shown in FIG. 5. Thereafter, an image is generated by capturing the virtual 3D space 20 by a specific field of view (point of sight and line of sight). The resulting image is hereinafter referred to as field of view image, and such an image as shown in FIG. 6 is displayed on the display screen 109. Note here that the reference image object 24 is the one derived by subjecting, to frame imaging, a plurality of image data stored in the database 110 (refer to FIG. 3).

In the below, a specific process flow is described for initial display.

First of all, the coordinate system setting section 4 sets the virtual 3D space 20 with a coordinate system configured by XYZ axes (coordinate system setting step S1 of FIG. 4). Herein, the XY plane is a virtual horizontal plane 21. As to the term virtual horizontal plane, the extension direction of this virtual horizontal plane has nothing to do with the horizontal direction on the actual space if it is displayed on the display screen 109, and can be freely set.

The object control section 5 then disposes a background object to the virtual 3D space 20 (step S2 of FIG. 4). The background object in this embodiment is a text object 22 that indicates a calendar, i.e., year. The meaning of the calendar displayed by the text object 22 will be described later.

The field of view setting section 7 then sets a field of view for generating a field of view image of the virtual 3D space 20 (field of view setting step S3 of FIG. 4). A field of view setting vector 23 of FIG. 5 conceptually represents the point of sight and the line of sight, both of which define the field of view when a field of view image is generated for the virtual 3D space 20, i.e., the field of view setting vector 23 is not a kind of object. An end point portion 23a denotes the point of sight, and an arrow portion 23b denotes the line of sight.

The object control section 5 then performs a calculation to derive the coordinates at which the reference image object 24 is disposed, i.e., the coordinates representing the position of a reference point of the object (step S4 of FIG. 4). Based on the calculation result, the object control section 5 then disposes the reference image object 24 in the virtual horizontal plane 21 not to overlap with others therein (step S5 of FIG. 4). That is, in steps S4 and S5, a reference image object is disposed. Note here that information about the reference image object 24, e.g., size, frame color, and transmissivity, is under the management of the property management section 6.

Based on the point of sight and the line of sight set by the field of view setting section 7, the imaging section 8 then generates a field of view image for the text object 22 and the reference image object 24 in the virtual 3D space 20 (imaging step S6 of FIG. 4). In this manner, as shown in FIG. 6, the display screen 109 displays thereon a field of view image as a result of capturing the virtual 3D space 20 by a specific point of sight and line of sight.

The calculation in step S4 to derive the coordinates at which the reference image object 24 is disposed is performed based on a "date of image capture". This "date of image capture" is found in any one attribute data related to the image data being the basis of the reference image object 24, and in this embodiment, found in the Exif data (refer to FIG. 3). In detail, on the side in the positive direction of the Y axis, disposed is the reference image object 24 of the earlier image data, and on the side in the negative direction of the Y axis, disposed is the reference image object 24 of the recent image data. More in detail, the reference image objects 24 of the image data captured in the same quarter of the year, i.e., 3 months, are disposed in line at the same Y coordinate, and among these reference image objects 24 at the same Y coordinate, the reference image objects 24 of the relatively-recent image data are disposed on the side in the positive direction of the X axis.

The text object 22 indicating the calendar disposed in step S2 is provided to establish a visual relationship between the coordinates at which the reference image object 24 is disposed and the "date of image capture" of the image data. That is, the positional relationship between the position of the calendar displayed by the text object 22 and any target reference image object 24 tells to which image data the reference image object 24 belongs, and when the image data is captured. As a modified example, to achieve the similar effects, a background object may be disposed in the virtual horizontal plane 21 to make it serve as a background image of the reference image object 24.

In this embodiment, the Y coordinate for the reference image object 24 is set in every quarter of the year. Alternatively, this time scale may be made changeable, e.g., every week, or every year. With this being the case, the display contents of the text object 22 being a background object may be also changed based on such a changeable time scale, e.g., every month, or every five years. Still alternatively, to equalize the number of image data found in the time period of the same Y coordinate, the time scale corresponding to the Y coordinate may be changed on a coordinate basis.

The relationship with the attribute data and the coordinate axis for use as a basis to determine the coordinates for object placement is not restrictive to the above embodiment, and any various changes are allowed to make. For example, the region of the virtual horizontal plane 21 may be divided based on the "index" of the attribute data, and in any predetermined resulting divided region, the reference image objects 24 of the image data under the same index may be disposed in line.

With the position of the reference image object 24 on the virtual horizontal plane 21, the viewer of the display screen 109 can intuitively know when the corresponding image data is captured. If with a display image of FIG. 6, for example, the viewer can acknowledge that the images disposed frontward are those recently captured, and the images disposed rearward are those previously captured.

The display screen 109 displays thereon a cursor 40 that can be moved by the input unit 107. The viewer operates the input unit 107 so as to place the cursor 40 on any arbitrary reference image object 24 displayed on the display screen 109. Through such an operation, the viewer can select the reference image object 24.

By referring to FIGS. 2, 7, 8, and 9, described next is image display when a reference image object is selected.

Figure 7:
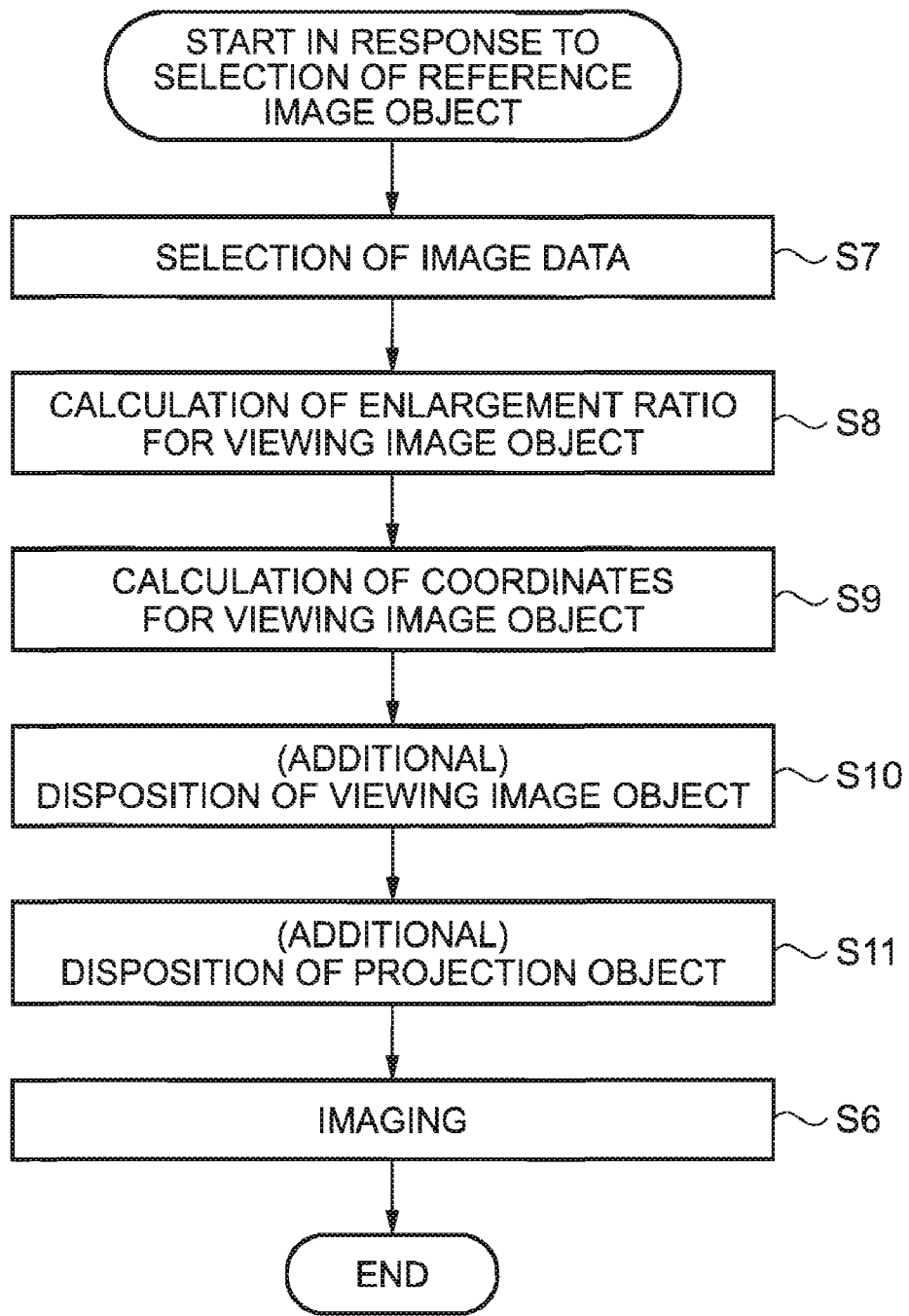
FIG. 7 is a flowchart showing a process flow when a reference image object is selected.
Figure 8:
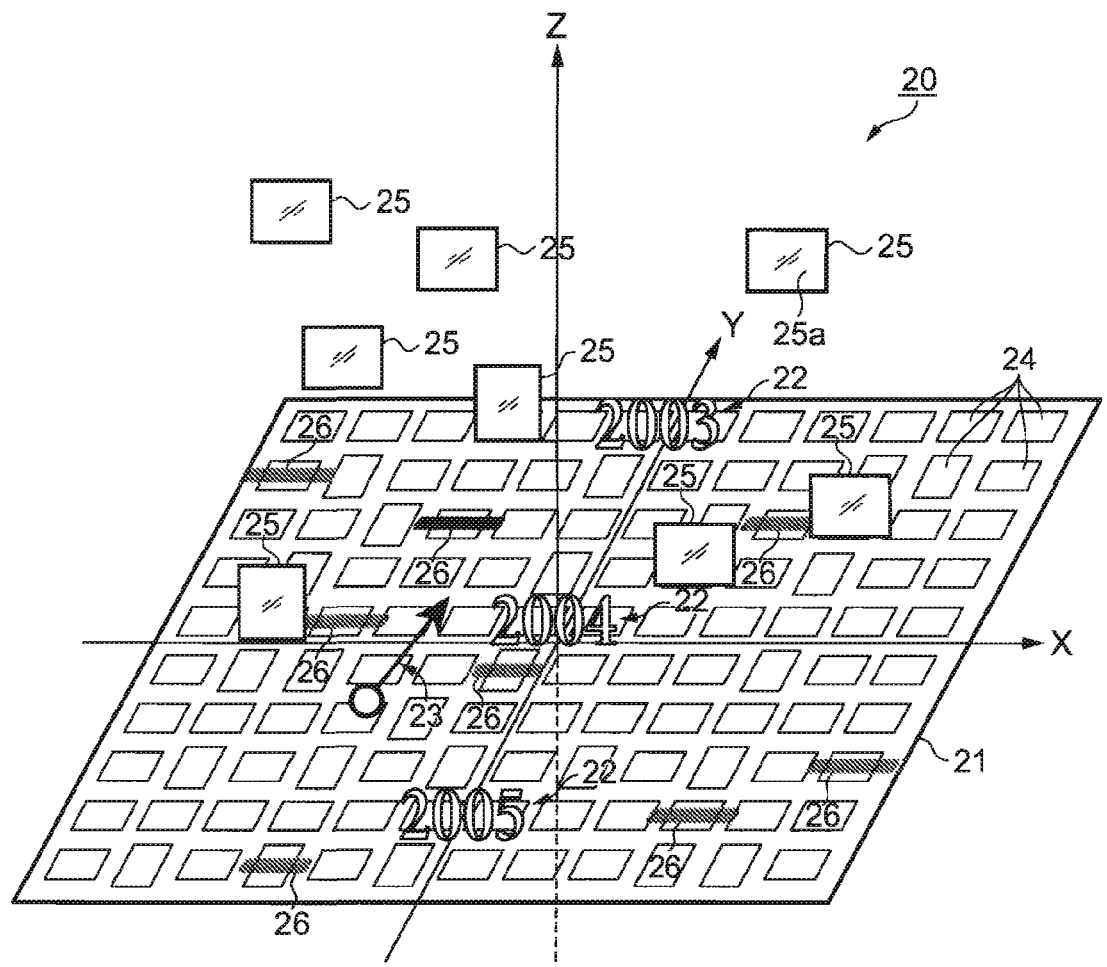
FIG. 8 is a diagram showing another virtual 3D space.
Figure 9:
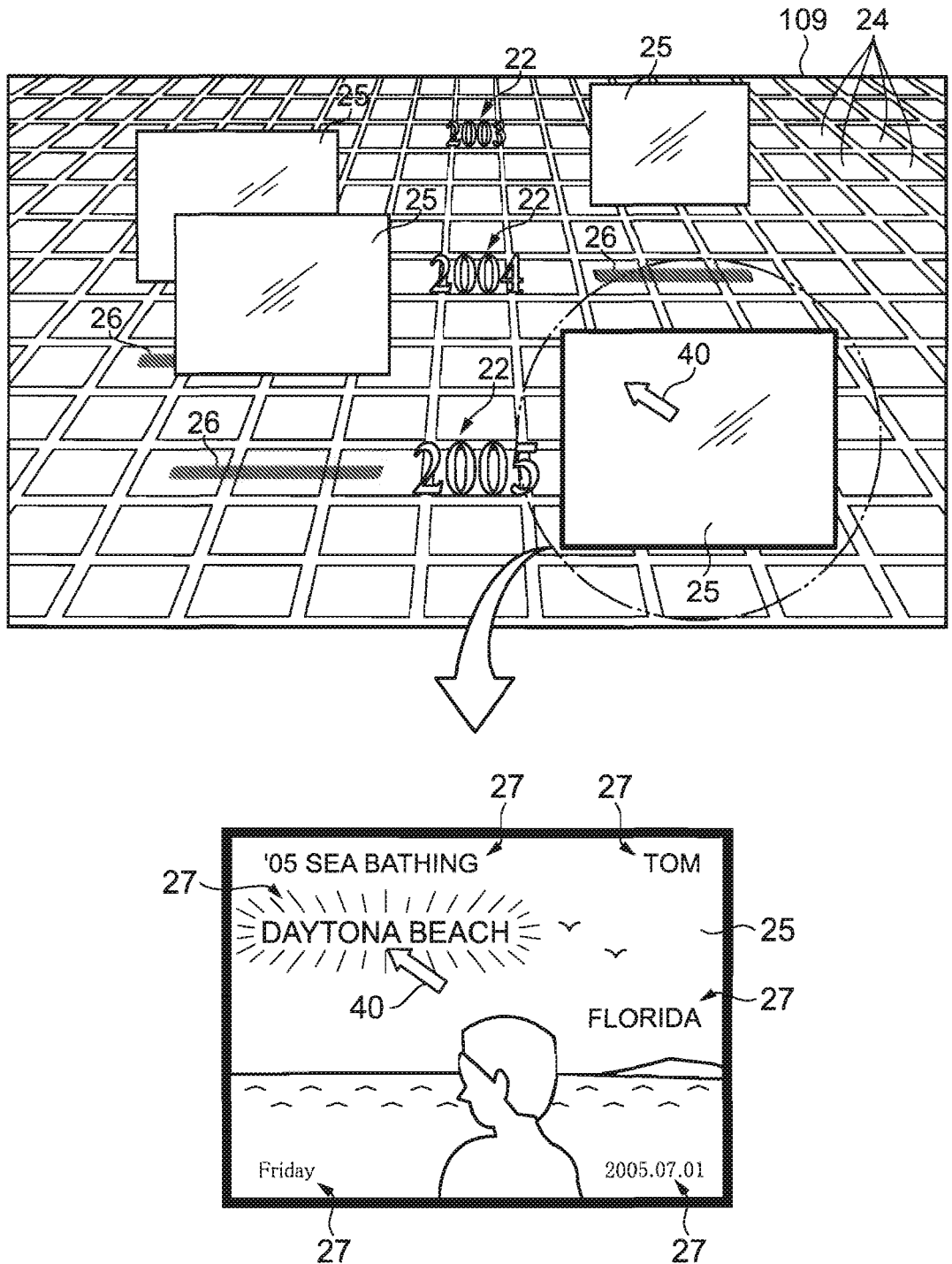
FIG. 9 is a diagram showing another display image displayed on the display screen.

FIG. 7 is a flowchart showing a process flow when a reference image object is selected. FIG. 8 is a diagram showing another virtual 3D space. FIG. 9 is a diagram showing another display image displayed on the display screen.

When any specific reference image object 24 is selected, as shown in FIG. 8, the viewing image object 25 of the corresponding image data is disposed in the virtual 3D space 20. The drawing shows a plurality of viewing image objects 25, and this is aimed to show the state in which the reference image objects 24 are selected one after another. Herein, the viewing image object 25 is similar to the reference image object 24, which is derived by subjecting the image data to frame imaging. Unlike the reference image object 24, however, the viewing image object 25 is disposed with a distance from the virtual horizontal plane 21. The viewing image object 25 is increased in size to be larger than the reference image object 24 before being disposed.

In such a case that the viewing image object 25 is displayed on the display screen 109 as shown in FIG. 9, the viewing image object 25 becomes available for viewing by the viewer. The viewing image object 25 is disposed with a distance from the virtual horizontal plane 21 only for the selected specific image data. With such an object placement, the viewer never be confused about which is the viewing image object 25 due to various many reference image objects 24 displayed densely on the same virtual horizontal plane 21. In this embodiment, because the viewing image object 25 is made larger than the reference image object 24, this is considered especially suitable for detail viewing.

Described below is a specific process flow when a reference image object is selected.

When any arbitrary reference image object 24 is selected, the data selection section 3 selects any corresponding image data from many others stored in the database 110 (data selection step S7 of FIG. 7).

The object control section 5 then calculates the enlargement ratio for the viewing image object 25 (step S8 of FIG. 7). Alternatively, the enlargement ratio may be calculated based on any attribute data related to the image data being the basis of the viewing image object 25, e.g., "significance level" (refer to FIG. 3).

Next, the object control section 5 calculates the coordinates at which the viewing image object 25 is disposed (step S9 of FIG. 7). Based on the calculation result, the viewing image object 25 is so disposed that a display plane 25a thereof becomes orthogonal to the virtual horizontal plane 21 (step S10 of FIG. 7). That is, in steps S9 and S10, a viewing image object is disposed. When any viewing image object 25 is already disposed before in step S10, another viewing image object 25 is additionally disposed.

More specifically, the viewing image object 25 is disposed directly above the corresponding reference image object 24. However, it is not strictly required to be directly above, and when there is already another viewing image object 25 in the vicinity, to prevent possible object interference, the viewing image object 25 may not be disposed directly above the corresponding reference image object 24. That is, the viewing image object 25 serves well if it is disposed at the position helping the viewer acknowledge the correspondence with the reference image object 24 on the virtual horizontal plane 21, i.e., substantially above the corresponding reference image object 24.

The height of the viewing image object 25 from the virtual horizontal plane 21, i.e., the distance therefrom, may be made constant for every viewing image object 25, or may be varied to avoid possible object interference. Still alternatively, the height of the viewing image object 25 may be determined based on the "significance level" of the corresponding image data.

The object control section 5 then disposes a projection object 26 (projection step S11 of FIG. 7). The projection object 26 indicates the position of the viewing image object 25 projected on the virtual horizontal plane 21, and is provided to help the viewer perceive with ease the position of the viewing image object 25 in the XY coordinate system. When any projection image object 26 is already disposed before in step S11, another projection image object 26 is additionally disposed.

The projection object 26 is preferably disposed directly below the corresponding viewing image object 25. However, it is not strictly required to be directly below. Moreover, the shape of the projection object 26 is not necessarily required to correspond to the shape of the viewing image object 25, and is not restrictive as long as the shape helps the viewer acknowledge the projection position.

Lastly, the imaging section 8 subjects again, to imaging, the objects 22, 24, 25, and 26 in the virtual 3D space 20 (imaging step S6 of FIG. 7), and as shown in FIG. 9, the display screen 109 displays thereon the resulting images.

As described in the foregoing, the viewing image object 25 is so disposed that the display plane 25a thereof becomes orthogonal to the virtual horizontal plane 21. This accordingly allows the viewer viewing the viewing image object 25 on the display screen 109 to view the viewing image object 25 in a different dimension from the various many reference image objects 24 also disposed in the virtual horizontal plane 21. Note here that the slope of the display screen 25a against the virtual horizontal plane 21 is not necessarily orthogonal, and the slope may serve well as long as it is of a degree ensuring the viewing image object 25 to be displayed in a different dimension from the reference image objects 24.

The viewing image object 25 is positioned substantially directly above the corresponding reference image object 24. With such object placement, the position of the viewing image object 25 in the XY coordinate system tells the viewer when the corresponding image data is captured. Especially in this embodiment, the projection object 26 helps the viewer acknowledge the position of the viewing image object 25 in the XY coordinate system, and the viewer can also easily know when the image data is captured. This accordingly enables to make a relative comparison based on the positional relationship among a plurality of viewing image objects 25, i.e., which of the corresponding image data is new or old. Based on the relationship among any target viewing image object 25 and various many reference image objects 24, the viewer can also know about the image data corresponding to the target viewing image object 25, e.g., when the image data is captured with what type of image data.

If the viewing image object 25 is defined by enlargement ratio based on the "significance level" of the corresponding image data, the size of the viewing image object 25 tells the viewer of the significance level of the corresponding image data. Through size comparison among a plurality of viewing image objects 25, the significance levels thereof can be relatively compared.

If the height of the viewing image object 25 from the virtual horizontal plane 21 is determined based on the "significance level" of the corresponding image data, the height of the viewing image object 25, i.e., the distance from the virtual horizontal plane 21, tells the viewer the significance level of the corresponding image data. Alternatively, through height comparison among a plurality of viewing image objects 25, the significance levels thereof can be relatively compared.

With the display image on the display screen 109 of FIG. 9, the viewer can select any arbitrary viewing image object 25 through operation of the input unit 107. As a result, in the vicinity of the selected viewing image object 25, a text object 27 is displayed as shown in the drawing. This text object 27 displays attribute data related to the image data corresponding to the selected viewing image object 25 (refer to FIG. 3). In the drawing, an index is "'05 sea bathing", annotations are "Daytona Beach (area name)", "Tom (person's name)", and "Florida (area name)", and information about Exif data is "Friday (day of the week when the image is captured), and "Jul. 1, 2005 (date when the image is captured).

By referring to FIGS. 2, 9, and 10, described below is a specific process flow when a viewing image object is selected.

Figure 10:
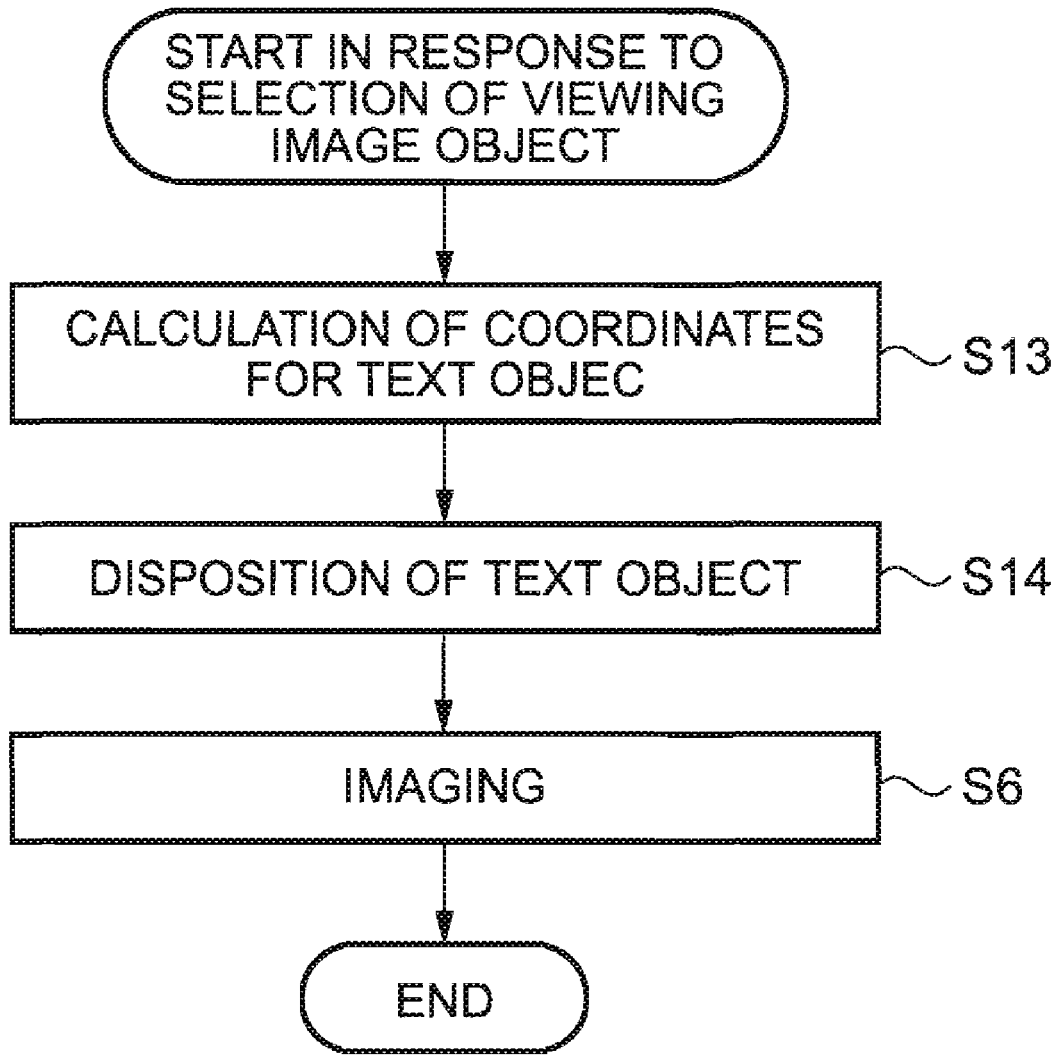
FIG. 10 is a flowchart showing a process flow when a viewing image object is selected.

FIG. 10 is a flowchart showing a process flow when a viewing image object is selected.

When any arbitrary viewing image object 25 is selected, the object control section 5 calculates the coordinates at which the text object 27 is disposed (step S13 of FIG. 10). Based on the calculation result, the text object 27 is so disposed that the display plane thereof becomes substantially parallel to the display plane of the viewing image object 25 (step S14 of FIG. 10). That is, in steps S13 and S14, a text object is disposed. To be specific, the text object 27 is so disposed as to overlay the selected viewing image object 25.

The imaging section 8 then subjects the text object 27 and other objects to imaging again (imaging step S6 of FIG. 10). As a result, as shown in FIG. 9, the text object 27 is displayed on the display screen 109 while being placed over the selected viewing image object 25.

With the display image on the display screen 109 of FIG. 9, the viewer can select any arbitrary text object 27 through operation of the input unit 107. After such object selection, the displayed viewing image object 25 is updated.

By referring to FIGS. 2, 8, 9, and 11, described below is a specific process flow when a text object is selected.

Figure 11:
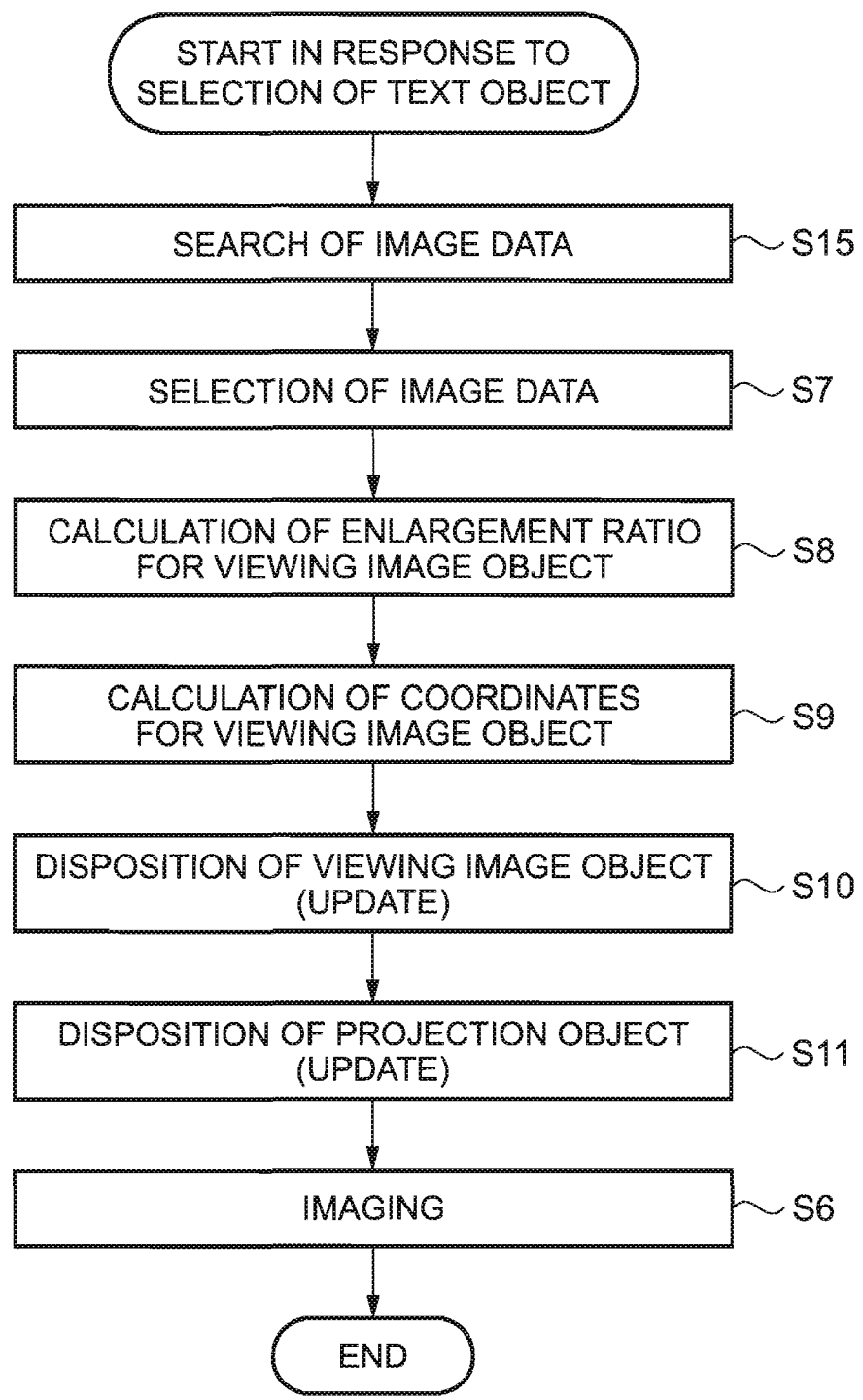
FIG. 11 is a flowchart showing a process flow when a text object is selected.

FIG. 11 is a flowchart showing a process flow when a text object is selected.

When any arbitrary text object 27 is selected, the data selection section 3 makes a search of any image data relating to the corresponding attribute data (step S15 of FIG. 11), and selects thus found image data (data selection step S7 of FIG. 11). Assuming that the text object 27 displaying "Daytona Beach" is selected with the image of FIG. 9, the data selection section 3 accordingly selects the image data relating to the attribute data carrying therein the contents of "Daytona Beach". In this manner, the image data relating to "Daytona Beach" is plurally selected.

The selected image data is then subjected to several processes, i.e., calculation of an enlargement ratio for the viewing image object 25 (step S8 of FIG. 11), calculation of coordinates for object placement (step S9 of FIG. 11), placement of the viewing image object 25 (step S10 of FIG. 11), and placement of the projection object 26 (step S11 of FIG. 11). These steps S8, S9, S10, and S11 are executed almost similarly to the previous case of selecting the reference image object 24, except that the viewing image object 25 and the projection object 26 are updated before being disposed. That is, the previous objects 25 and 26 are deleted before the viewing image object 25 and the projection object 26 newly selected in step S7 are disposed.

Lastly, the imaging section 8 again subjects the objects in the virtual 3D space 20 to imaging (imaging step S6 of FIG. 11), and as shown in FIG. 9, the resulting images are displayed on the display screen 109.

As such, the viewing image object 25 is displayed on the display screen 109 through selection of the respective reference image objects 24 as described above. Other than this, through input of information relating to the above-described attribute data, any relating image data may be directly selected. With such a method, for any relating image data, the viewing image object 25 can be swiftly displayed for viewing. Note that, in this embodiment, although the attribute data is determined through selection of the text object 27 associated with a searching. As a modified example, the input unit 107 such as keyboard may be used to directly input information (text) about the attribute data, and any related image data may be selected.

The viewer can issue a command using the input unit 107 to change a field of view to display a display image in which the point of sight and the line of sight are changed with respect to the virtual 3D space 20. With such a field of view change command, the viewer can zoom in any specific viewing image object 25 and reference viewing image 24 for detail viewing, or can view the objects with any blind spot in the field of view.

By referring to FIGS. 2, 12, and 13, described below is a specific process flow when a field of view change command is issued.

Figure 12:
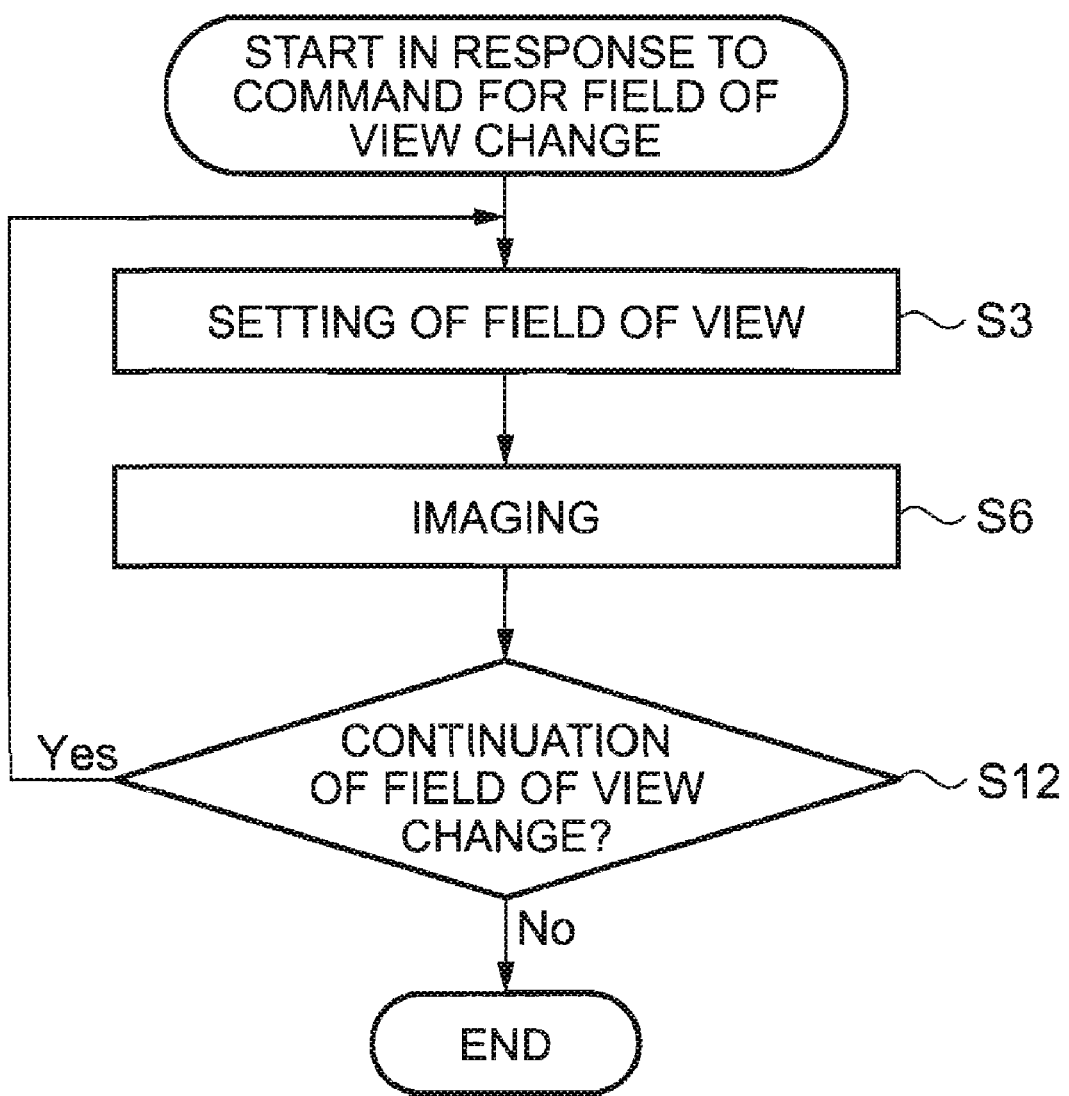
FIG. 12 is a flowchart showing a process flow when a command comes to change the field of view.

FIG. 12 is a flowchart showing a process flow when a command comes to change the field of view. FIG. 13 is a diagram showing the state in which a field of view setting vector is moved in the virtual 3D space.

Figure 13:
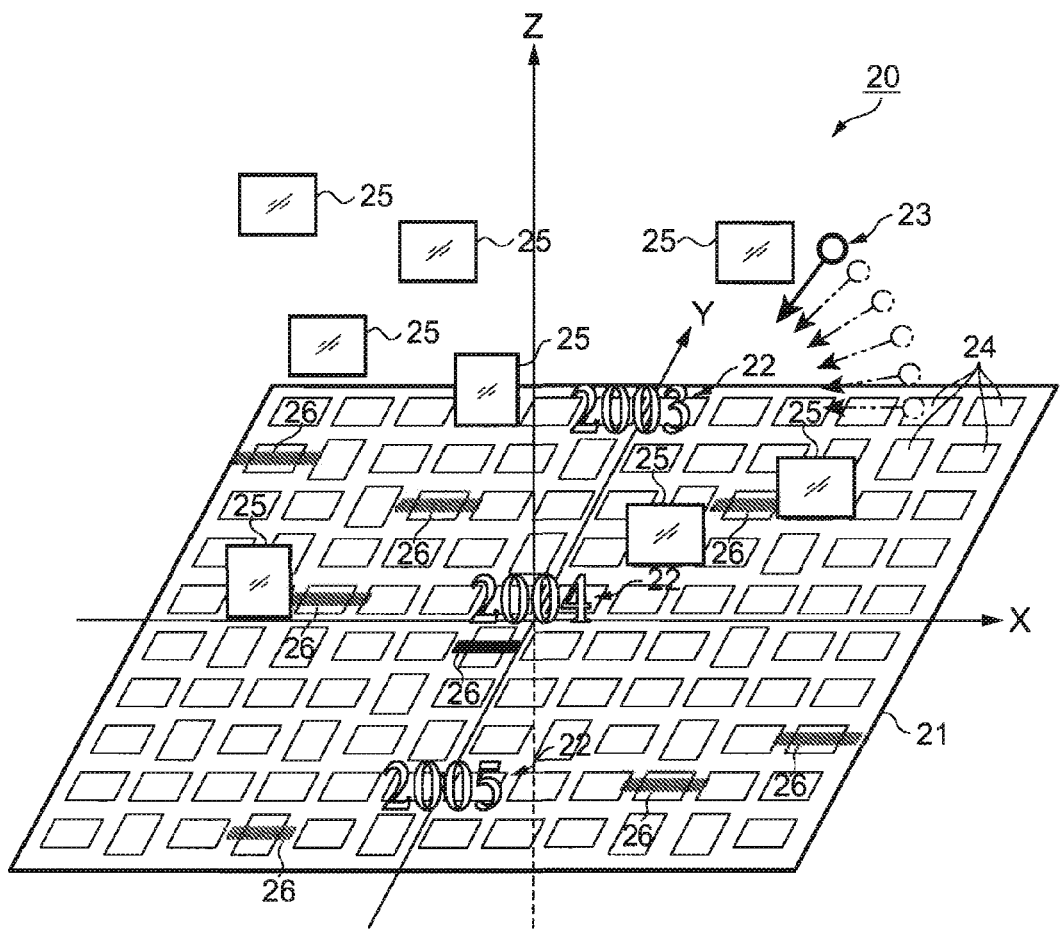
FIG. 13 is a diagram showing the state in which a field of view setting vector is moved in the virtual 3D space.

When a field of view change command is input, as shown in FIG. 13, the field of view setting section 7 makes the field of view setting vector 23 translate or rotate to move by a predetermined difference (field of view setting step S3 of FIG. 12). The imaging section 8 then subjects, to imaging, the objects in the virtual 3D space 20 again (imaging step S6 of FIG. 12). In this manner, the display screen 109 (refer to FIG. 1) displays thereon again the display image this time with the field of view different from that of the original display image.

The field of view setting section 7 then makes a determination whether or not to continue such a field of view change process (step S12 of FIG. 12). When the determination result tells to continue (Yes), the procedure repeats the processes in steps S3, S6, and S12 at predetermined time intervals, e.g., time interval of 1/30 second in this embodiment. When the determination result tells not to continue (No), the field of view change process is ended.

As such, the field of view change process is executed by repeatedly, at predetermined intervals, moving such a field of view setting vector 23 as shown in FIG. 13 by a predetermined difference and subjecting the objects to imaging. That is, the display screen 109 (refer to FIG. 1) displays thereon the course of changing the field of view as a moving image. Herein, the time interval for the imaging process relating to the field of view change is not necessarily made uniform as long as it serves well for smooth display of a moving image.

The flow of the field of view change process may be modified as below. That is, after the field of view vector 23 is moved in step S3, the viewing image object 25 and the projection object 26 may be disposed (again) in consideration of the vector movement, and then the objects may be subjected to imaging (again) in step S6. This enables image display with the display plane of the viewing image object 25 always facing the side of the point of sight. Moreover, in the above embodiment, the issuance of a field of view change command changes both the point of sight and the line of sight. This is not restrictive, and such a modification is possible as only the point of sight is allowed to be changed.

As is evident from the above description, the image display device 1 is capable of displaying the viewing image object 25 for any arbitrary image data with any arbitrary point of sight and line of sight. As to setting conditions about the viewer's favorite field of view or viewer's selection of the image data, the viewer can store those as a storage file in the hard disk 104 (refer to FIG. 1). The viewer can easily reproduce the display image with the setting conditions by making the image display device 1 read the storage file.

By referring to FIGS. 2, 8, and 14, described below is a specific process flow when a storage file is read.

Figure 14:
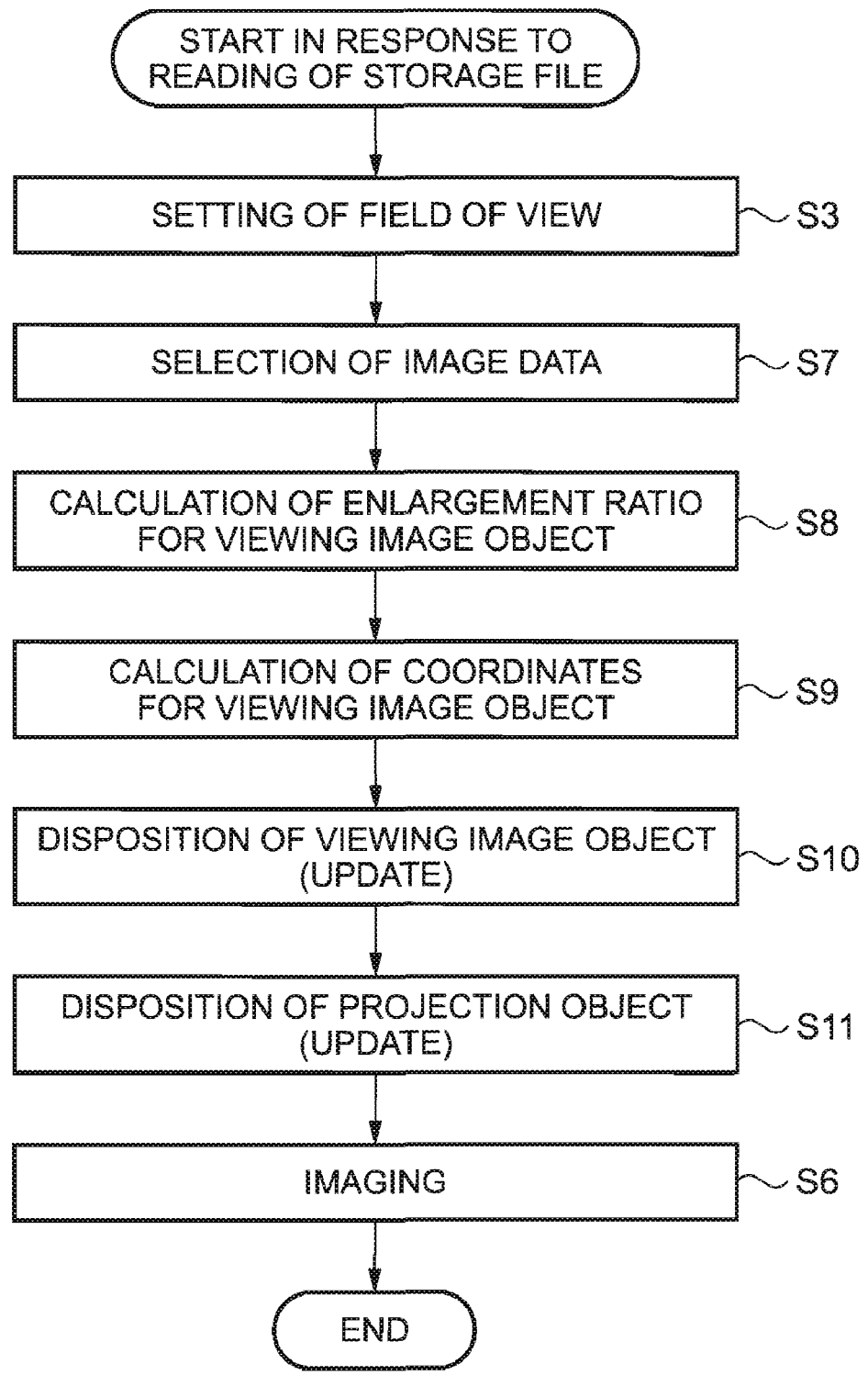
FIG. 14 is a flowchart showing a process flow when a storage file is read.

FIG. 14 is a flowchart showing a process flow when a storage file is read.

When a storage file is read, first of all, the field of view setting section 7 makes settings of the field of view setting vector 23 in accordance with the setting conditions in the storage file (field of view setting step S3 of FIG. 14). Thereafter, the data selection section 3 makes a selection of the image data in accordance with the setting conditions in the storage file (data selection step S7 of FIG. 14). The selected image data is then subjected to several processes, i.e., calculation of an enlargement ratio for the viewing image object 25 (step S8 of FIG. 14), calculation of coordinates for object placement (step S9 of FIG. 14), placement of the viewing image object 25 (step S10 of FIG. 14), and placement of the projection object 26 (step S11 of FIG. 14). Thereafter, any new display image is displayed after the imaging process again (imaging step S6 of FIG. 14).

First Modified Example

Figure 15:
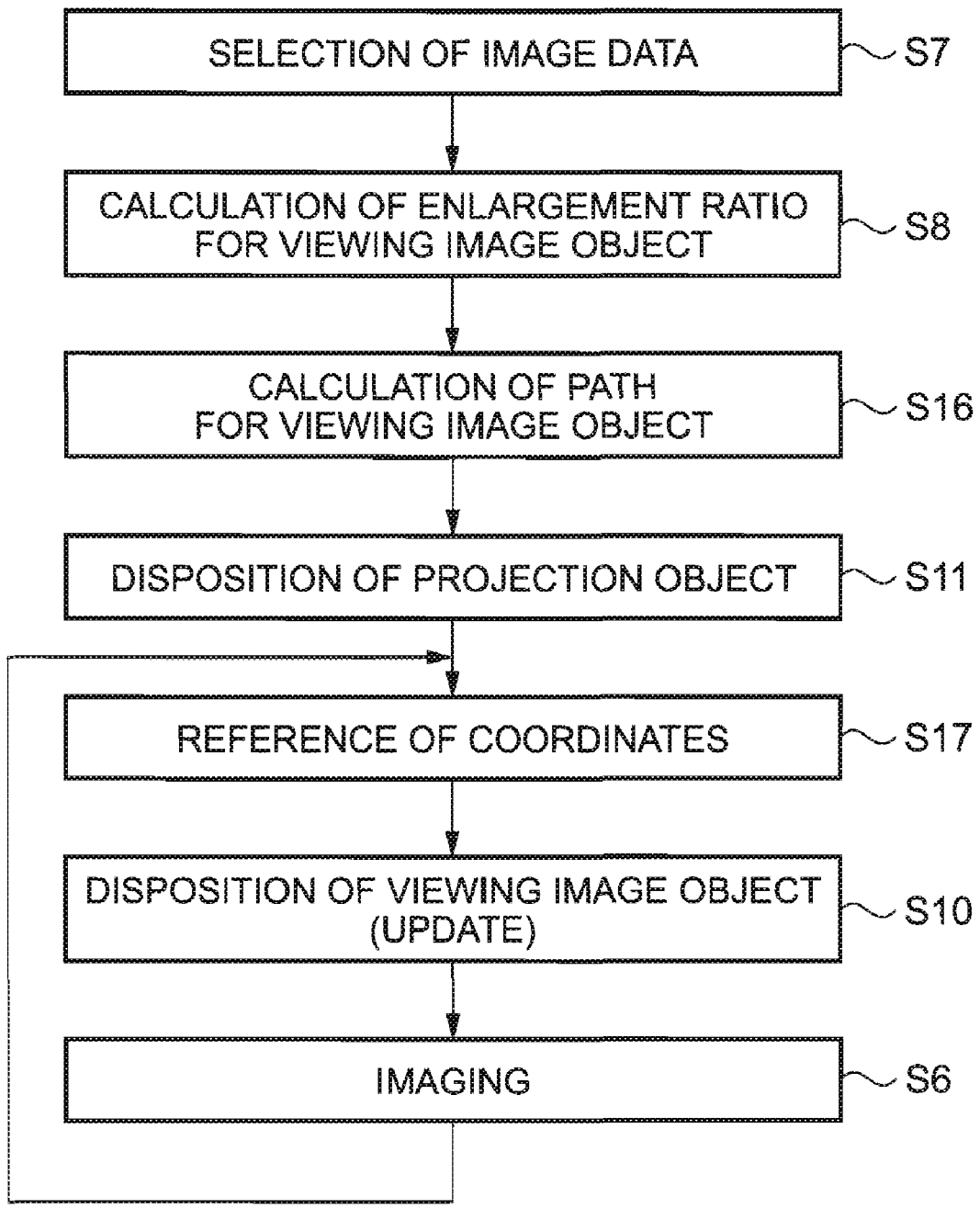
FIG. 15 is a flowchart partially showing a flow of an image display process in a first modified example.
Figure 16:
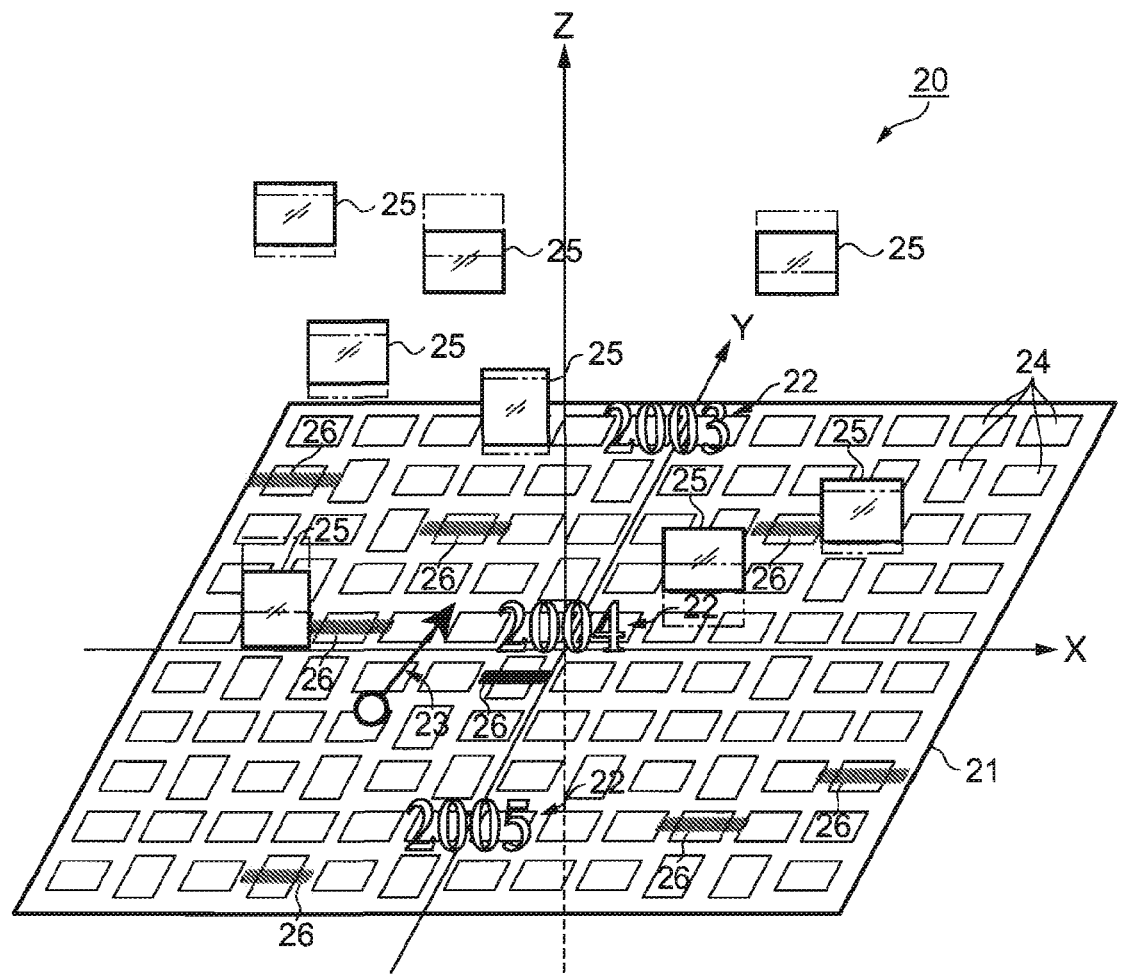
FIG. 16 is a diagram showing a virtual 3D space in the first modified example.

By referring to FIGS. 2, 15, and 16, described next is a first modified example. FIG. 15 is a flowchart partially showing a flow of an image display process in a first modified example. FIG. 16 is a diagram showing a virtual 3D space in the first modified example.

The image display device 1 of this first modified example is so configured as to go through a process of image display at predetermined time intervals, e.g., time interval of 1/30 second, through updating, and the display screen 109 (refer to FIG. 1) displays thereon the virtual 3D space 20 as a moving image. Herein, the time interval for updating the image display is not necessarily made uniform as long as it serves well for smooth display of a moving image.

As a result of such a process of moving image display, as shown in FIG. 16, the viewing image objects 25 are displayed as if separately being in a swing motion in the virtual 3D space 20. Accordingly, even if the viewing image objects 25 are overlapping one another in the depth direction of the field of view, the degree of overlapping changes depending on the timing for viewing. This favorably helps the viewer to view a plurality of viewing image objects without changing his or her field of view. The specific process flow of the first modified example will be described later.

After any specific image data is selected in the manner described above (data selection step S7 of FIG. 15), the object control section 5 goes through processes of calculating an enlargement ratio for the viewing image object 25 (step S8 of FIG. 15), and calculating a path for coordinates (positions) at which the viewing image objects 25 are disposed associated with the moving image display (object path calculation step S16 of FIG. 15). The object control section 5 then disposes the projection object 26 (projection step S11 of FIG. 15).

The following steps S17, S10, and S6 are a series of processes, which is repeated with the time interval of 1/30 second. The object control section 5 refers to the placement coordinates at the respective time intervals from the calculation result of step S16 (step S17 of FIG. 15), and disposes (again) the viewing image objects 25 (step S10 of FIG. 15). The imaging section 8 then subjects the objects to the imaging process again (imaging step S6 of FIG. 15). The processes of steps S17, S10, and S6 are repeated until the image data is selected again. When a field of view change command is issued in the course thereof, the process of moving the field of view setting vector 23 is additionally executed during the process execution in steps S17, S10, and S6.

The path associated in step S16 is represented by a periodic function in which a swing motion is made around an upper point of the corresponding reference image object 24, and in this embodiment, is represented by a function of simple harmonic motion in the Z-axis direction. That is, in step S16, the center point of the path is set based on the placement coordinates of the corresponding reference image object 24, and then the amplitude (swing width) of the function of the simple harmonic motion, period, and initial phase are set so that the placement coordinates are calculated for the viewing image object 25 at the respective time intervals.

When the image data is plurally selected, the processes in steps S16 and S10, i.e., calculating a path for coordinates at which the viewing image objects 25 are disposed, and disposing (again) the viewing image objects 25, are executed for every image data, i.e., every viewing image object 25. In this modified example, the period of the function of a simple harmonic motion and the initial phase are set at random for every image data, i.e., every viewing image object 25. That is, consideration is given to make the viewing image objects 25 separately swing while those being displayed as moving images.

In this modified example, the viewing image objects 25 displayed as moving images simply swing in the Z-axis direction, i.e., are put in a simple harmonic motion, and never move in the XY-axis direction. In consideration thereof, the process in step S11, i.e., disposing the projection objects 26 indicating the projection positions of the viewing image objects 25 onto the virtual horizontal plane 21 (XY-axis plane), skips the process of disposing again the objects at the respective time intervals. However, this is surely not restrictive, and the swing motion of the viewing image objects 25 displayed as moving images may possibly include components of XY-axis direction. If this is the case, the placement of the projection objects 26 (step S11) maybe updated at the respective time intervals.

As another modified example, at the time of path calculation in step S16, the period and the amplitude (swing width) associated with the swing motion may be set based on the "significance level" of the corresponding image data. If this is the case, the viewer can know the significance level of the corresponding image data by his or her perception how the viewing image objects 25 are swinging.

Second Modified Example

By referring to FIG. 17, described next is a second modified example.

Figure 17:
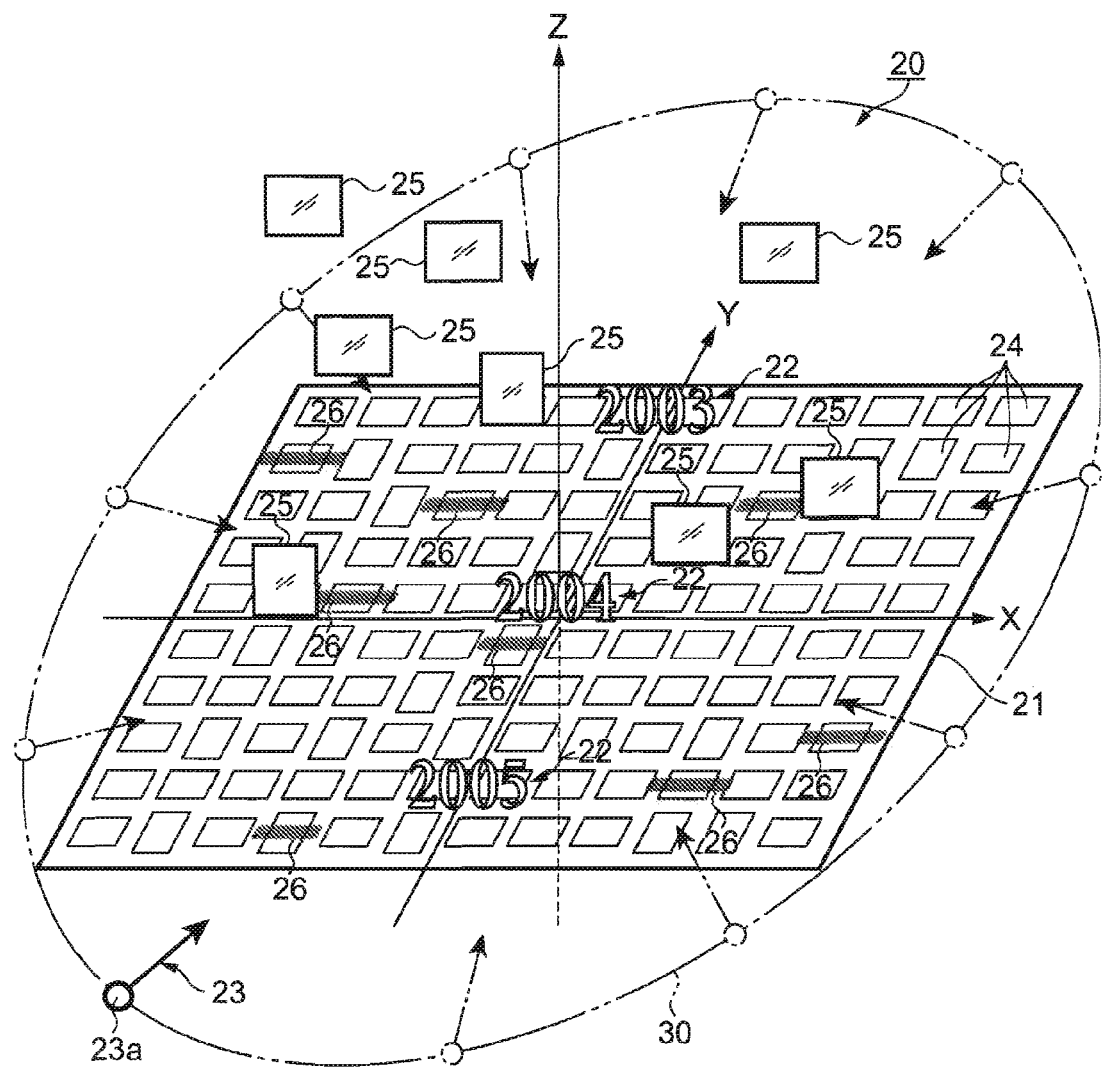
FIG. 17 is a diagram showing a go-around path for a field of view setting vector in the virtual 3D space.

FIG. 17 is a diagram showing a go-around path for a field of view setting vector in the virtual 3D space.

The image display device 1 (refer to FIG. 2) of this second modified example is with a mode for a field of view change process called go-around viewing mode. The image display device 1 is so configured as to go through a process of image display at predetermined time intervals, e.g., time interval of ⅟₃₀ second, through updating, and the display screen 109 displays thereon the virtual 3D space 20 as a moving image. That is, in this mode, as shown in FIG. 17, the end point portion 23a (point of sight) of the field of view setting vector 23 is moved along a go-around path 30 for image display. Such vector movement is based on the setting information previously provided for the field of view, and is made at predetermined time intervals. In this modified example, the line of sight of the field of view setting vector 23 is so set as to be directed always toward the origin of the virtual 3D space 20.

As such, the display screen 109 sequentially displays thereon field of view images, which are derived by viewing the virtual 3D space 20 from various positions and at various angles. This favorably helps the viewer easily get the overall perspective for the reference image object 24 and the viewing image object 25.

Third Modified Example

By referring to FIG. 18, described next is a third modified example.

Figure 18:
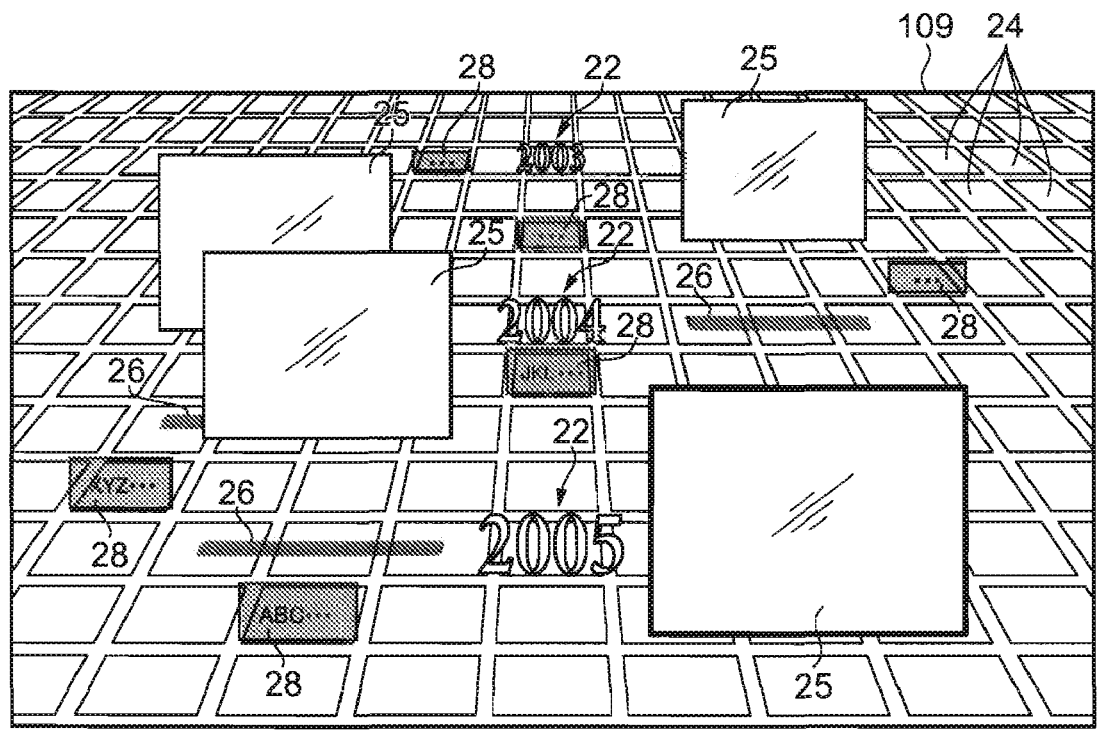
FIG. 18 is a diagram showing a display image in a third modified example.

FIG. 18 is a diagram showing a display image in the third modified example.

The image display device 1 (refer to FIG. 2) of this third modified example is so configured as to display a text object 28 in the vicinity of the reference image object 24 that is extracted at random. In this third modified example, the text object 28 displays the "index" (refer to FIG. 3) of the corresponding image data. With such object display, i.e., displaying the text object 28 indicating the corresponding attribute data in the vicinity of the reference image object 24, the viewer can perceive with more ease what reference image object 24 is disposed at where in the XY coordinate system.

Fourth Modified Example

By referring to FIGS. 2, 19, and 20, described next is a fourth modified example.

Figure 19:
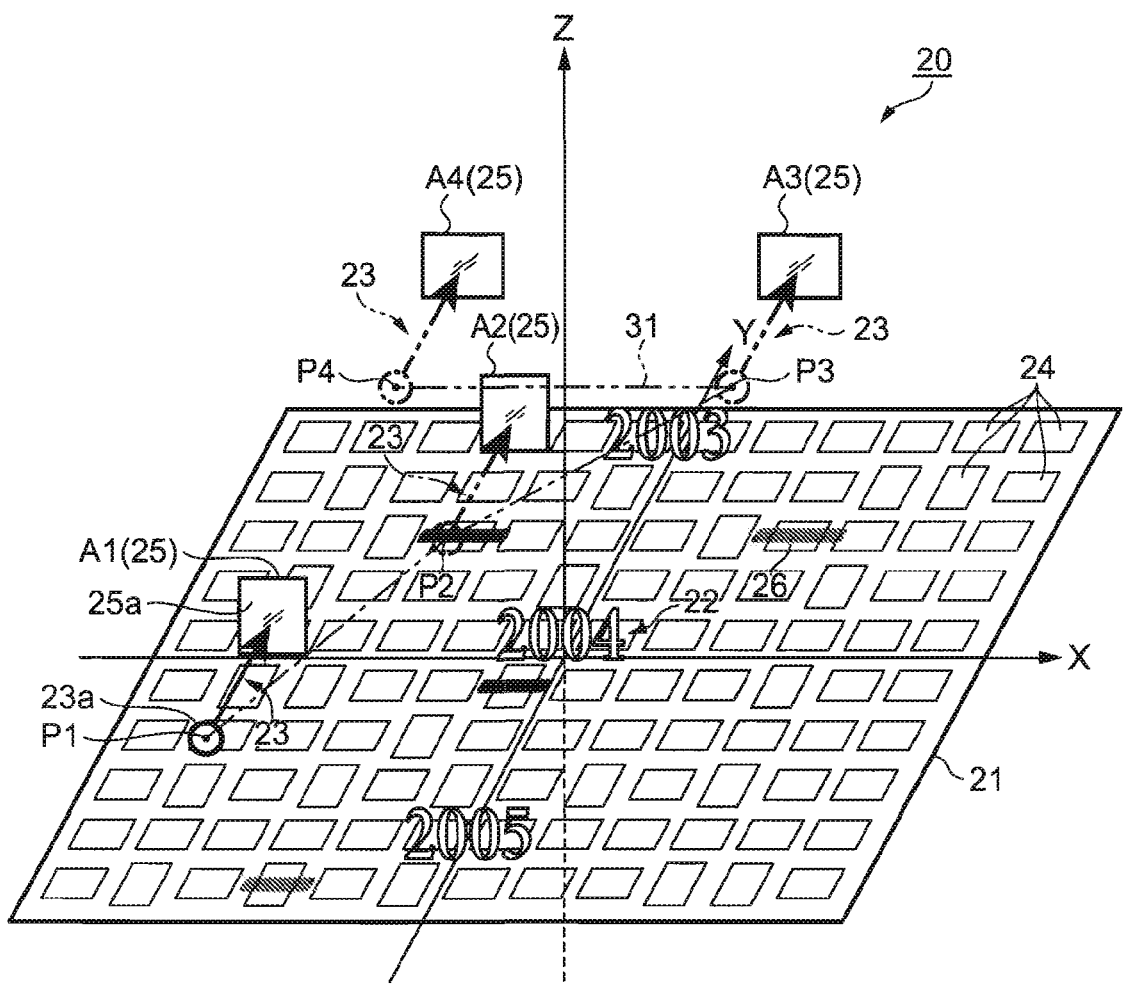
FIG. 19 is a diagram showing another state in which a field of view setting vector is moved in the virtual 3D space.

FIG. 19 is a diagram showing the state in which a field of view setting vector is moved in the virtual 3D space. FIG. 20 is a flowchart showing a flow of an image display process in the fourth modified example.

The image display device 1 of this fourth modified example is with a mode for a field of view change process called automatic viewing mode. The image display device 1 is so configured as to go through a process of image display at predetermined time intervals, e.g., time interval of ⅟₃₀ second, through updating, and the display screen 109 displays thereon an image of the virtual 3D space 20 as a moving image. That is, in this mode, as shown in FIG. 19, the end point portion 23a (point of sight) of the field of view setting vector 23 is moved at predetermined time intervals along a path 31 for image display. In this modified example, the line of sight of the field of view setting vector 23 is so set as to be directed always toward the display plane 25a of the viewing image object 25, i.e., positive direction of the Y axis.

FIG. 19 shows selected viewing image objects 25 of four image data in the virtual 3D space 20, and for convenience, the viewing image objects 25 are referred to as A1 to A4 in the order of the latest image capture date first. In the drawing, first point to fourth points P1 to P4 each denote a position of a calculation result determined as appropriate for viewing the viewing image objects A1 to A4. In this example, the first to fourth points P1 to P4 are set to the positions facing the viewing image objects A1 to A4, respectively. The path 31 is the one visually representing the function of time taken to move over the first to fourth points P1 to P4 in order like a line graph.

In the above example, the display screen 109 sequentially displays thereon a field of view image, which is derived by viewing the virtual 3D space 20 from the point of sight along the path 31. Accordingly, the viewer can view the viewing image objects A1 to A4 in order at the first to fourth points P1 to P4, which are each considered a preferable point of sight. While the viewer's point of sight moves along the first to fourth points P1 to P4, if the viewer looks at the reference image objects 24 in the field of view, the viewer can know what image data is captured in the "date of image capture" corresponding to the viewing image objects A1 to A4. In FIG. 19 example, while the viewer's point of sight moves, the reference image objects 24 located in the field of view are sequentially changed from new to old in terms of "date of image capture". Therefore, the viewer can grasp the information of "date of image capture" about the viewing image objects A1 to A4 as if traveling in time.

Described below is a specific process flow when a command is issued for an automatic viewing mode.

Figure 20:
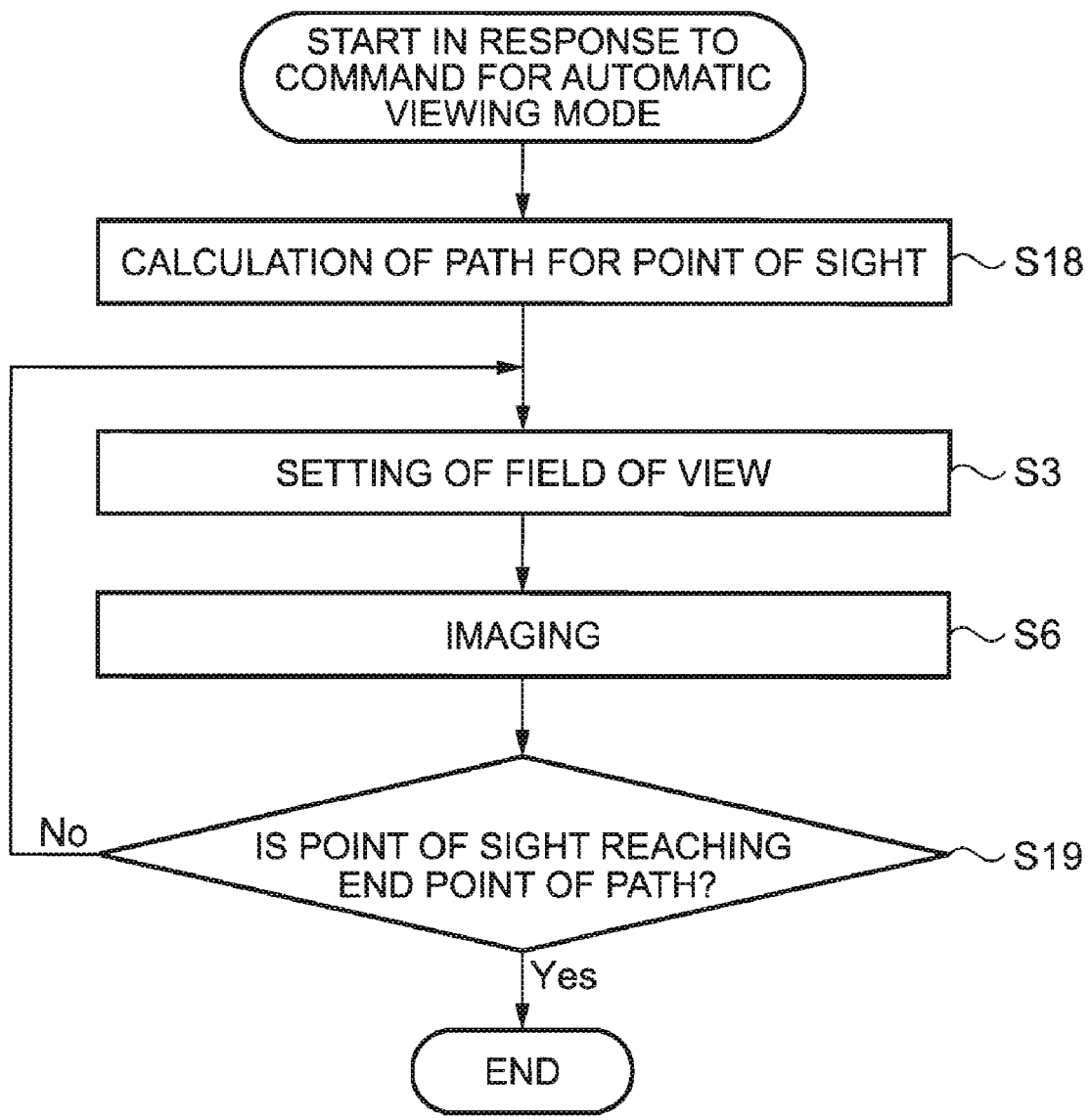
FIG. 20 is a flowchart showing a flow of an image display process in a fourth modified example.

When a command is issued for an automatic viewing mode in the state that the image data corresponding to the viewing image objects A1 to A4 is currently selected, first of all, the field of view setting section 7 calculates a path for the point of sight (field of view path calculation step S18 of FIG. 20).

More in detail, the first to fourth points P1 to P4 are set at opposing positions to the placement coordinates of the viewing image objects A1 to A4, and any predetermined movement speed is also set so that the data calculation (function of coordinates) is performed for the path 31 moving over the first to fourth points P1 to P4 like a line graph.

At the timing, the field of view setting section 7 then sets a field of view by referring to the data about the path 31 for the coordinates of the end point portion 23a (point of sight) of the field of view setting vector 23 (field of view setting step S3 of FIG. 20). The imaging section 8 then generates a field of view image in thus set field of view for the virtual 3D space 20 (imaging step S6 of FIG. 20). This is the end of the process of image display at a specific timing.

The field of view setting section 7 then makes a determination whether or not the coordinates of the end point portion 23a (point of sight) of the field of view setting vector 23 is reaching the end point of the path 31, i.e., the fourth point P4 (step S19 of FIG. 20). More specifically, when the determination result tells that the end point portion 23a is not yet reaching at the fourth point P4 (No), the procedure goes through again the above-described processes in steps S3 and S6 at the next time interval. When the determination result tells that the end point portion 23a is reaching at the fourth point P4 (Yes), the process of the automatic viewing mode is ended. As such, until the end point portion 23a (point of sight) of the field of view setting vector 23 reaches the fourth point P4, the above-described processes in steps S3 and S6 are repeated, and the display screen 109 sequentially displays thereon the field of view image derived by viewing the virtual 3D space 20 from the point of sight along the path 31.

Second Embodiment

By referring to FIG. 21, described next is a second embodiment of the invention.

Figure 21:
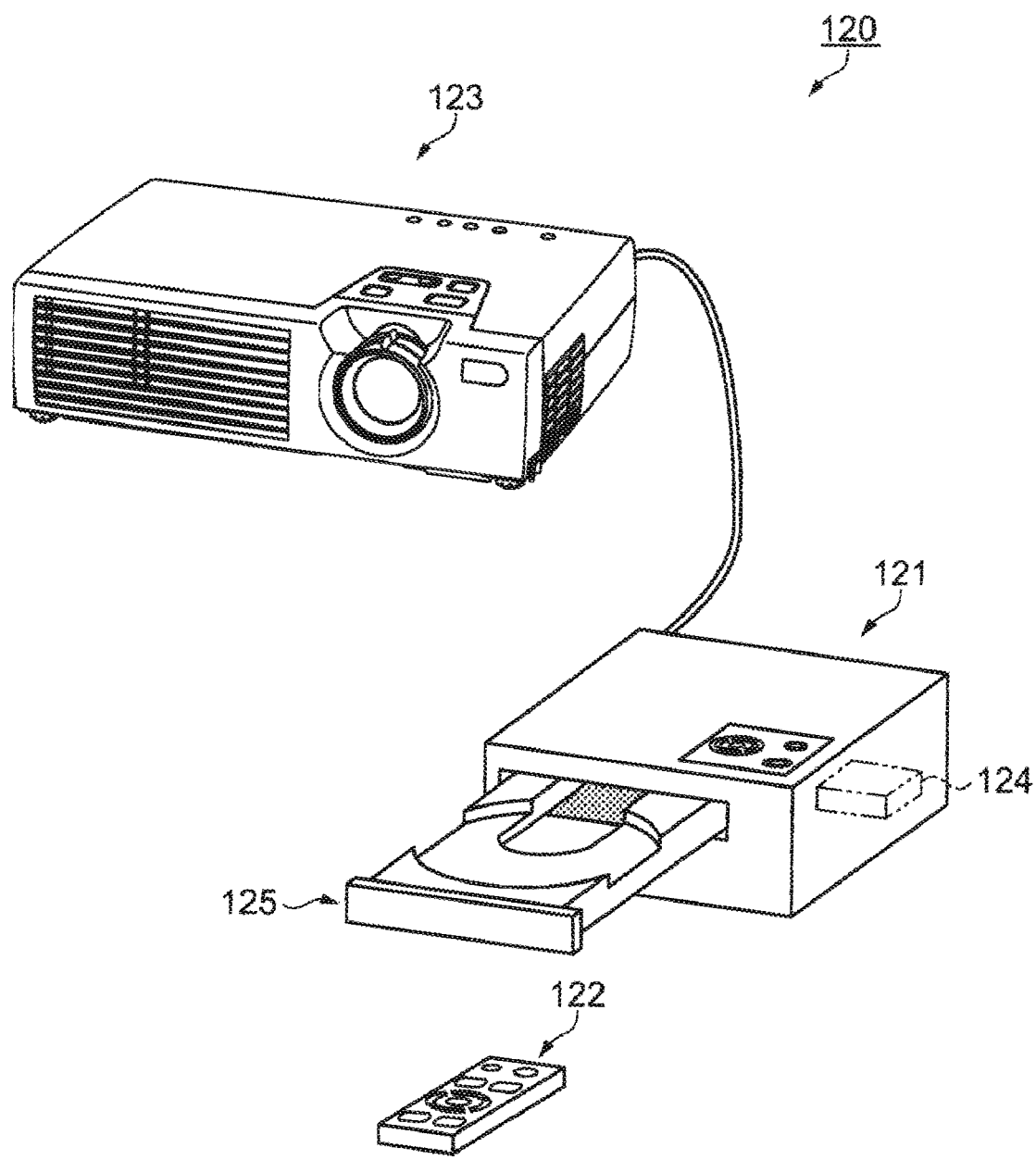
FIG. 21 is a diagram showing an exemplary configuration of an image display system.

FIG. 21 is a diagram showing an exemplary configuration of an image display system.

An image display system 120 of FIG. 21 is configured to include: an electronic device 121; a remote controller 122 in charge of information input to the electronic device; and a projector 123 serving as an electro-optical device that displays, as a video, output information from the electronic device 121. The electronic device 121 is equipped with an information processing chip 124, a drive device 125, and a communications unit with a network that is not shown. The information processing chip 124 serves as an image display device having the same functions as the image display device 1 of the first embodiment (refer to FIG. 2). The drive device 125 is used for reading disk-shaped recording media such as CD-ROMs.

Such an image display system 120 accesses any external database via the drive device 125 or the communications unit, and displays image information generated by the information processing chip 124 after converting the information into videos by a projector 123. As a result, the projection plane of the projector 123 displays thereon such images as described in the first embodiment.

Third Embodiment

By referring to FIG. 22, described next is a third embodiment of the invention.

Figure 22:
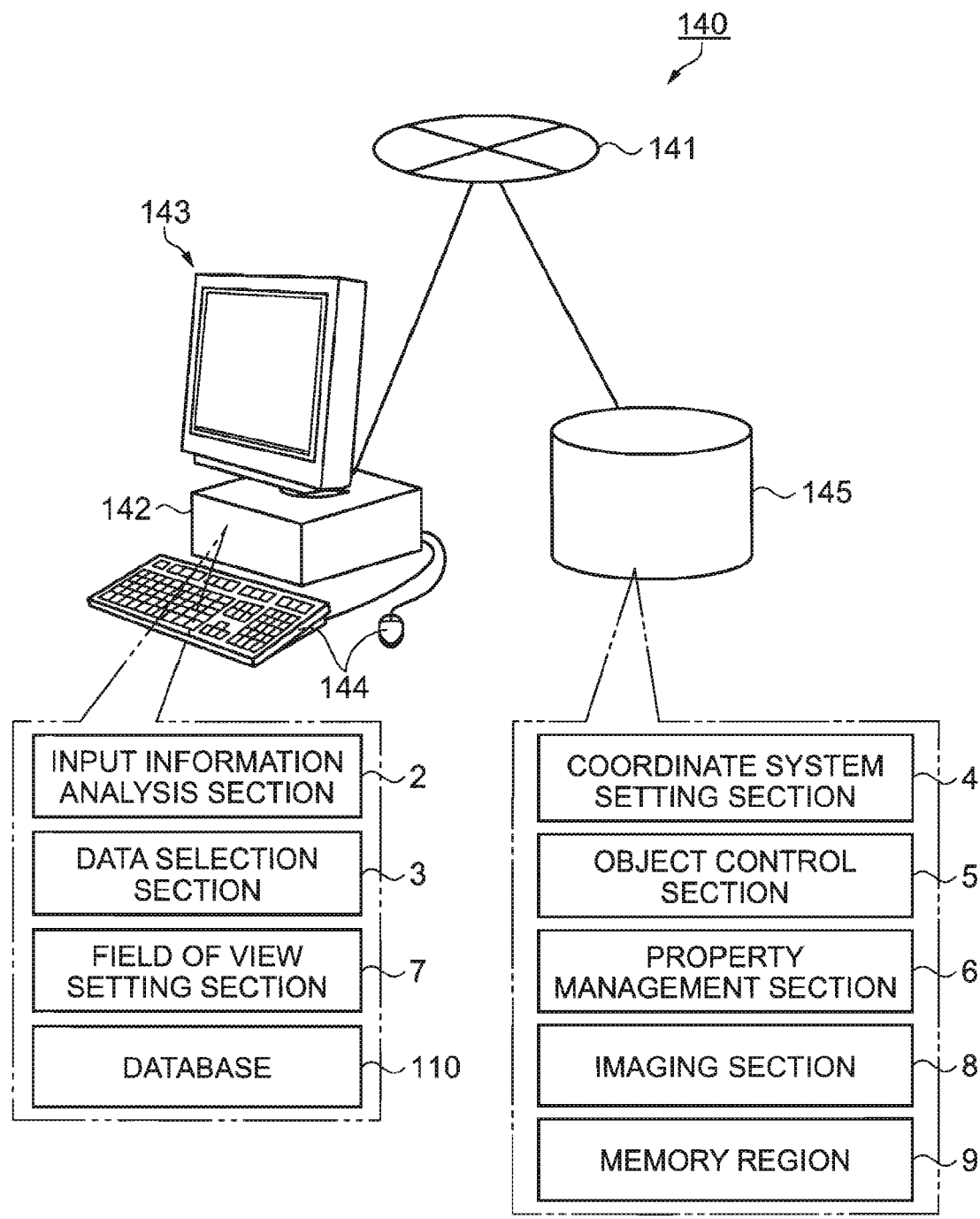
FIG. 22 is a diagram showing another exemplary configuration of an image display system.

FIG. 22 is a diagram showing another exemplary configuration of the image display system.

An image display system 140 of FIG. 22 is configured to include a personal computer 142 connected thereto over a network 141, and a server 145. The personal computer 142 has the same hardware configuration as that of the computer 100 of the first embodiment (refer to FIG. 1), and is equipped with a display 143 and an input unit 144.

The personal computer 142 includes therein the database 110, and reads an application program provided over the network 141 or via a recording medium so that a function module is generated therein as the input information analysis section 2, the data selection section 3, and the field of view setting section 7. The server 145 includes various function modules as the coordinates system setting section 4, the object control section 5 the property management section 6, the imaging section 8, and the memory region 9.

These function modules work similar to the image display device 1 of the first embodiment (refer to FIG. 2) as the image display system 140 in its entirety so that the display screen of the display 143 displays thereon such images as described in the first embodiment. Note that, such a configuration of the image display system over the network is not restrictive, and alternatively, the function modules in the personal computer 142 and the server 145 may be distributed to a plurality of servers.

The invention is surely not restrictive to the above-described embodiments.

For example, the transmissivity of the viewing image object 25 may be changed based on the distance from the point of sight. More in detail, the viewing image object 25 being away from the point of sight may be increased in transmissivity so that the perspective of the field of view image may be brought closer to the human sensibilities for representation.

Moreover, a display operation mode can be incorporated to allow image data corresponding to the viewing image object 25 selected using the input unit 107 to be enlarged and displayed as a reproduction image separately from other objects displayed on the virtual 3D space 20. The resulting reproduction image can be provided with a text related to the attribute data.

The configuration components of the embodiments can be combined or omitted if appropriate, and combined with any other configuration components that are not shown.

The entire disclosure of Japanese Patent Application Nos: 2005-223935, filed Aug. 2, 2005 and 2006-151410, filed May 31, 2006 are expressly incorporated by reference herein.

What is claimed is:

1. An image display method for displaying, after imaging, a plurality of image data each relating to attribute data, comprising:

disposing a plurality of reference image objects, on a display device, each corresponding to each of the plurality of image data at a position based on any one of the corresponding attribute data in one virtual horizontal plane in a virtual three-dimensional (3D) space;

selecting one or more of the image data from the plurality of image data on the display device;

disposing, on the display device, a viewing image object for indication of the selected image data at a position of any of the corresponding reference image objects moved in a direction of a normal to the virtual horizontal plane, a distance of the viewing image object from the virtual horizontal plane is determined based on the other of the corresponding attribute data;

setting a field of view in the virtual 3D space on the display device;

imaging, on the display device, the virtual 3D space in the field of view set in the setting the field of view, the disposing of the viewing image object and the imaging are performed at predetermined time intervals; and calculating, with a computer processor, a path along which the viewing image object is disposed at the respective time intervals, and which swings around the position of any of the corresponding reference image objects moved in the direction of the normal to the virtual horizontal plane, a swing width or a swing cycle of the path is determined based on the other of the corresponding attribute data.

2. The image display method according to claim 1, wherein the viewing image object is disposed to derive orthogonality between a virtual display plane and the virtual horizontal plane.

3. The image display method according to claim 1, wherein the viewing image object is disposed after being enlarged compared with the reference image object.

4. The image display method according to claim 3, wherein an enlargement ratio of the viewing image object is determined based on the other of the corresponding attribute data.

5. The image display method according to claim 4, wherein the other attribute data is about a significance level of the image data.

6. The image display method according to claim 1, further comprising:
  disposing, on the display device, a text object for display of the attribute data over or in the vicinity of any of the corresponding reference image objects or the viewing image object.

7. The image display method according to claim 1, further comprising:
  projecting, on the display device, a projection object for indication of a projection position of the viewing image object on the virtual horizontal plane.

8. The image display method according to claim 1, further comprising:
  acquiring, with the computer processor, input information about the attribute data; and
  performing, with the computer processor, a search of the image data relating to the input information, wherein
  in the selecting the data, the image data found in the performing the search is selected.

9. The image display method according to claim 1, wherein the setting the field of view and the selecting the data are performed based on setting conditions in storage.

10. The image display method according to claim 1, wherein
  the setting the field of view is performed at the predetermined time intervals, and
  the setting the field of view is performed based on a path along which a point of sight moves at each of the time intervals in the field of view, and which goes around the virtual 3D space.

11. The image display method according to claim 1, wherein
  when first and second of the plurality of image data are selected in the selecting the data, the setting the field of view is performed at the predetermined time intervals, and
  the method further comprises:
  calculating, with a controller, a path along which a point of sight moves at each of the time intervals in the field of view, and which extends from a first point facing a viewing image object corresponding to the first image data to a second point facing a viewing image object corresponding to the second image data.

12. An image display device for displaying, after imaging, a plurality of image data each relating to attribute data, comprising:
  a reference image disposition section that disposes a plurality of reference image objects each corresponding to each of the plurality of image data at a position based on any one of the corresponding attribute data in one virtual horizontal plane in a virtual three-dimensional (3D) space;
  a data selection section that selects one or more of the image data from the plurality of image data;
  a viewing image disposition section that disposes a viewing image object for indication of the selected image data at a position of any of the corresponding reference image objects moved in a direction of a normal to the virtual horizontal plane, a distance of the viewing image object from the virtual horizontal plane is determined based on the other of the corresponding attribute data;
  a field of view setting section that sets a field of view in the virtual 3D space;
  an imaging section that images the virtual 3D space in the field of view set in the field of view setting section, the disposing of the viewing image object and the imaging are performed at predetermined time intervals; and
  a calculating section that calculates a path along which the viewing image object is disposed at the respective time intervals, and which swings around the position of any of the corresponding reference image objects moved in the direction of the normal to the virtual horizontal plane, a swing width or a swing cycle of the path is determined based on the other of the corresponding attribute data.

13. A server in an image display system for displaying over a network, after imaging, a plurality of image data each relating to attribute data, comprising:
  a memory region that generates a virtual three-dimensional (3D) space;
  a reference image disposition section that disposes a reference image object for indication of each of the plurality of image data at a position based on any one of the corresponding attribute data in one virtual horizontal plane in the virtual 3D space;
  a viewing image disposition section that disposes, at a first predetermined time interval, a viewing image object for indication of the selected image data at a position of any of the corresponding reference image objects moved in a direction of a normal to the virtual horizontal plane;
  an imaging section that images, at a second predetermined time interval, the virtual 3D space in the field of view set in the field of view setting section;
  a distance determining section that determines a distance of the viewing image object from the virtual horizontal plane based on the other of the corresponding attribute data, the disposing of the viewing image object and the imaging are performed at predetermined time intervals; and
  a calculating section that calculates a path along which the viewing image object is disposed at the respective time intervals, and which swings around the position of any of the corresponding reference image objects moved in the direction of the normal to the virtual horizontal plane, the calculating section calculates a swing width or a swing cycle of the path that is determined based on the other of the corresponding attribute data.

* * * * *